(12) United States Patent
Kobayashi et al.

(10) Patent No.: US 9,864,934 B2
(45) Date of Patent: Jan. 9, 2018

(54) OPTICAL SCANNING DEVICE, IMAGE FORMING APPARATUS, AND CORRECTION METHOD

(71) Applicant: CANON KABUSHIKI KAISHA, Tokyo (JP)

(72) Inventors: Hisanori Kobayashi, Kawasaki (JP); Tetsuya Nishiguchi, Tagata-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/959,303

(22) Filed: Dec. 4, 2015

(65) Prior Publication Data
US 2016/0171350 A1    Jun. 16, 2016

(30) Foreign Application Priority Data

Dec. 10, 2014 (JP) ................................ 2014-250333
Dec. 10, 2014 (JP) ................................ 2014-250334

(51) Int. Cl.
| | | |
|---|---|---|
| G06K 15/12 | (2006.01) |
| G03G 15/043 | (2006.01) |
| H04N 1/00 | (2006.01) |
| H04N 1/04 | (2006.01) |
| H04N 1/06 | (2006.01) |
| H04N 1/113 | (2006.01) |
| B41J 2/44 | (2006.01) |

(52) U.S. Cl.
CPC ............ *G06K 15/1219* (2013.01); *B41J 2/44* (2013.01); *G03G 15/043* (2013.01); *H04N 1/00814* (2013.01); *H04N 1/0461* (2013.01); *H04N 1/06* (2013.01); *H04N 1/113* (2013.01)

(58) Field of Classification Search
CPC .............. G06K 15/1219; H04N 1/113; H04N 1/00814; H04N 1/0461; H04N 1/06; G03G 15/043; B41J 2/44
USPC .......................................................... 358/1.7
See application file for complete search history.

(56) References Cited

U.S. PATENT DOCUMENTS

| | | | |
|---|---|---|---|
| 6,480,289 B1 * | 11/2002 | Shimomura | ............ E21D 9/004 356/614 |
| 6,928,100 B2 | 8/2005 | Sato et al. | ..................... 372/109 |
| 7,508,859 B2 | 3/2009 | Azami et al. | ................. 372/101 |
| 8,130,250 B2 | 3/2012 | Suzuki et al. | ................ 347/233 |

(Continued)

FOREIGN PATENT DOCUMENTS

| | | |
|---|---|---|
| JP | 2003-322811 | 11/2003 |
| JP | 2004-098591 | 4/2004 |

(Continued)

*Primary Examiner* — Allen H Nguyen
(74) *Attorney, Agent, or Firm* — Fitzpatrick, Cella, Harper & Scinto

(57) ABSTRACT

The optical scanning device includes a storage unit configured to store information on a scanning time of laser light and an emitted position of the laser light in a sub-scanning direction, the laser light measured on a plane. A scanning time for forming one scanning line is set based on the information on the measured scanning time and the measured emitted position, which is stored in the storage unit, and a radius of a photosensitive drum. This allows a magnification error in a main scanning direction to be reduced with an inexpensive configuration while realizing downsizing of an apparatus.

30 Claims, 16 Drawing Sheets

(56) References Cited

U.S. PATENT DOCUMENTS

| | | | | |
|---|---|---|---|---|
| 2003/0043388 A1* | 3/2003 | Andrews | ............... | B41J 3/36 |
| | | | | 358/1.7 |
| 2004/0165240 A1* | 8/2004 | Suzuki | ............ | G02B 26/125 |
| | | | | 359/201.1 |
| 2006/0250276 A1* | 11/2006 | Levinson | ............ | G02B 6/4204 |
| | | | | 340/856.3 |
| 2008/0024851 A1* | 1/2008 | Sakaue | ............ | G02B 26/127 |
| | | | | 359/216.1 |
| 2009/0051982 A1* | 2/2009 | Suhara | ............ | H04N 1/113 |
| | | | | 358/475 |
| 2009/0059337 A1* | 3/2009 | Saisho | ............ | H04N 1/1135 |
| | | | | 359/205.1 |
| 2009/0122378 A1* | 5/2009 | Tomioka | ............ | H04N 1/1135 |
| | | | | 359/205.1 |
| 2010/0046056 A1* | 2/2010 | Kimura | ............ | G02B 26/125 |
| | | | | 359/204.1 |
| 2010/0097646 A1* | 4/2010 | Yamawaki | ............ | G02B 26/123 |
| | | | | 358/1.15 |
| 2010/0309537 A1* | 12/2010 | Tanahashi | ............ | H04N 1/1135 |
| | | | | 359/213.1 |

FOREIGN PATENT DOCUMENTS

| | | |
|---|---|---|
| JP | 2009-157154 | 7/2009 |
| JP | 2009-300604 | 12/2009 |

* cited by examiner

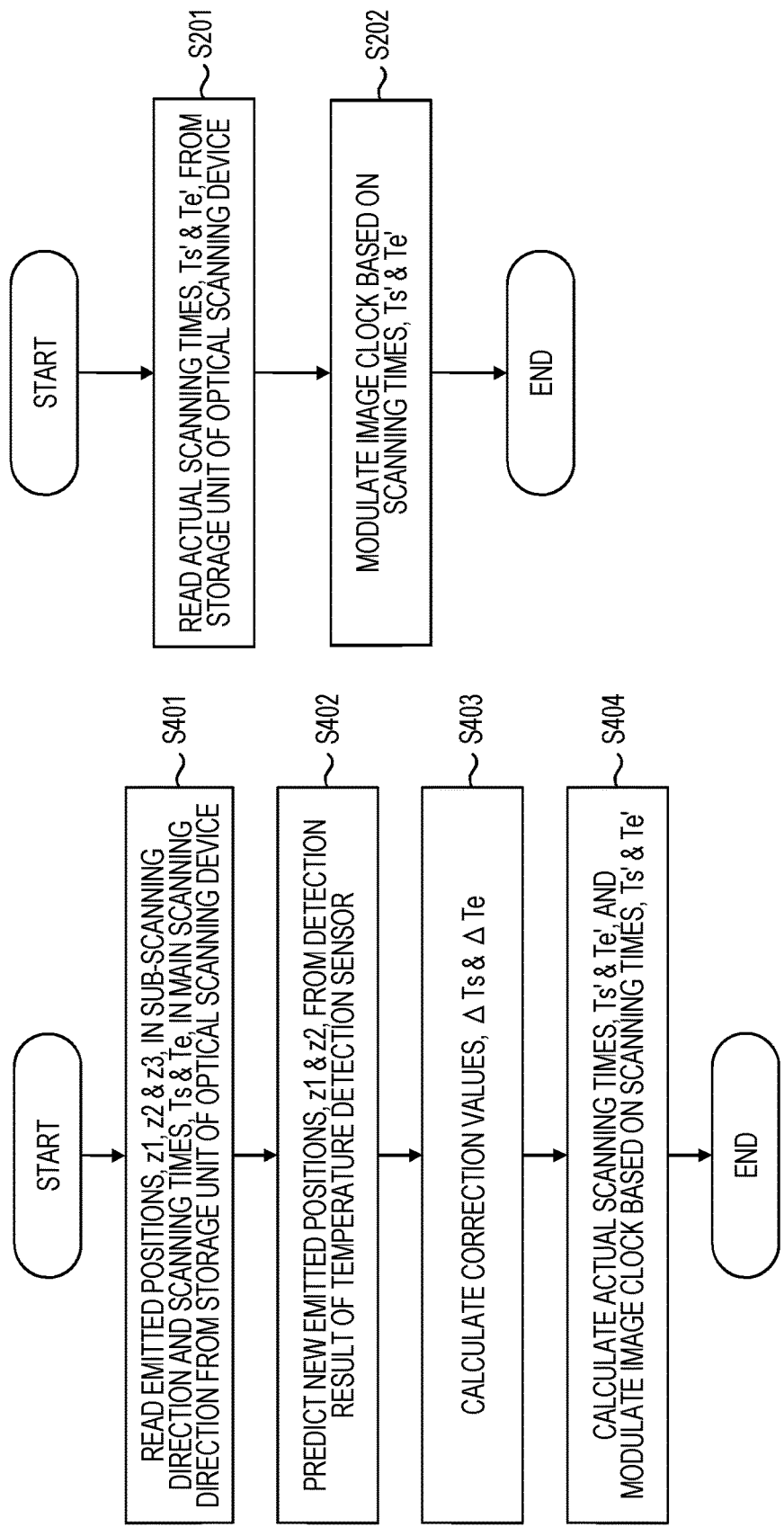
FIG. 8A / FIG. 8B

OPTICAL SCANNING DEVICE, IMAGE FORMING APPARATUS, AND CORRECTION METHOD

BACKGROUND OF THE INVENTION

Field of the Invention

The present invention relates to an optical scanning device, an image forming apparatus, and a correction method, and more particularly, to an image correction method preferred for an image forming apparatus such as a digital copying machine or a laser beam printer employing an electrophotographic process.

Description of the Related Art

Hitherto, in order to increase an image formation speed for an electrophotographic color image forming apparatus, there is proposed a tandem-type color image forming apparatus including as many developing devices and photosensitive drums as coloring materials, which is configured to transfer images of different colors in order onto an image conveyor belt or a recording medium. The tandem-type color image forming apparatus is already known to have a plurality of factors to cause misregistration, and there are proposed various countermeasures against the respective factors. Typical examples of the factors include an optical characteristic and mounting accuracy of a lens included in an optical scanning device mounted to an image forming apparatus and a deviation in assembling position of the optical scanning device with respect to an image forming apparatus main body. In those cases, on a scanned surface of the photosensitive drum to be exposed to light, a tilt or a bow occurs in a scanning line, and scanning lines differ in shape between colors, to thereby cause a relative difference between the scanning lines to appear as a color misregistration.

As a countermeasure against the color misregistration, there is proposed a method of correcting the scanning line by image data. For example, there is proposed a method of correcting an emitted position, a tilt, or a bow to be a shape error of a scanning line based on a result of measuring the emitted position of the scanning line in a sub-scanning direction (see, for example, Japanese Patent Application Laid-Open No. 2003-322811). Further, in order to correct the scanning line by the image data, the bow in the scanning line and a constant speed characteristic are required to be measured in advance in the sub-scanning direction, and a scanning time for a scanning line width is required to be measured in advance in a main scanning direction. As a method of obtaining measurement data for correction, the following configurations are proposed. For example, there are proposed such a configuration that the optical scanning device includes a scanning position detection unit, such a configuration as to read a toner image formed on a photosensitive drum or on an intermediate transferring belt through use of an image sensor, and such a configuration to store data for correction measured in advance in a control unit. Of those, such a configuration as to measure the scanning line in a process of manufacturing an optical scanning device in a factory (hereinafter referred to as "manufacturing process") and store the data for correction in the optical scanning device in advance is often used due to advantages in cost or productivity.

However, a related-art optical scanning device has a problem in that, when a light flux emitted from the optical scanning device is tilted toward the sub-scanning direction on a photosensitive drum surface, a one-side magnification difference is caused due to a deviation in the scanning time in the main scanning direction. In particular, a color image forming apparatus has a problem of causing a color misregistration in the main scanning direction because a plurality of scanning lines are superimposed on each other. FIG. 9A, FIG. 9B, FIG. 10A, and FIG. 10B are diagrams for illustrating the one-side magnification difference, and details thereof are described in embodiments described later. Such a scanning line L' tilted as illustrated in FIG. 9A scans a surface of a photosensitive drum D as illustrated in FIG. 9B. Therefore, an optical path length difference $\Delta x1$ is caused with a light flux L1, and an optical path length difference $\Delta x2$ is caused with a light flux L2. When the optical path length differences $\Delta x1$ and $\Delta x2$ are caused, the scanning time deviates by $\Delta Ts$ and $\Delta Te$ from ideal scanning times Ts and Te illustrated in FIG. 10A. Therefore, a magnification of the scanning line is supposed to be an equal magnification as illustrated in part (1) of FIG. 10B, but causes the one-side magnification difference that exhibits different magnifications on a left side and on a right side as illustrated in part (2) of FIG. 10B.

In recent years, with downsizing of the image forming apparatus, the photosensitive drum also has a smaller radius. Therefore, as the radius of the photosensitive drum decreases, the one-side magnification difference becomes more noticeable because the above-mentioned optical path length difference becomes a less negligible deviation amount, which raises a fear of causing the color misregistration.

SUMMARY OF THE INVENTION

The present invention has been made in view of such circumstances, and has an object to reduce a magnification error in a main scanning direction with an inexpensive configuration while realizing downsizing of an apparatus.

In order to achieve the above-mentioned object, the present invention provides the following configurations.

According to one embodiment of the present invention, there is provided an optical scanning device, including a light source configured to emit laser light, a deflection unit configured to deflect the laser light emitted from the light source, and move a spot of the laser light emitted onto a scanned surface in a main scanning direction, to thereby form a scanning line, and a storage unit configured to store information on a scanning time of the laser light and an emitted position of the laser light in a sub-scanning direction perpendicular to the main scanning direction, which are measured on a plane, in which a scanning time for forming one scanning line is set based on the information on the measured scanning time and the measured emitted position, which is stored in the storage unit, and information on a shape of the scanned surface.

According to another embodiment of the present invention, there is provided an image forming apparatus, including a photosensitive member including a scanned surface in a surface of the photosensitive member, a light source configured to emit laser light, a deflection unit configured to deflect the laser light emitted from the light source, and move a spot of the laser light emitted onto the scanned surface in a main scanning direction, to thereby form a scanning line, a storage unit configured to store information on a scanning time of the laser light and an emitted position of the laser light in a sub-scanning direction perpendicular to the main scanning direction, which are measured on a plane, and a control unit configured to cause a latent image to be formed on the scanned surface, the control unit being further configured to set a scanning time taken by the laser light to scan the scanned surface based on the information on the scanning time and the emitted position measured on the plane, which is read from the storage unit, and the information on the shape of the scanned surface.

According to another embodiment of the present invention, there is provided an optical scanning device, including a light source configured to emit laser light, a deflection unit configured to deflect the laser light emitted from the light source, and move a spot of the laser light emitted onto a scanned surface in a main scanning direction, to thereby form a scanning line, and a storage unit configured to store information on a scanning time taken by the laser light to scan the scanned surface in order to form one scanning line, the scanning time stored in the storage unit being calculated based on information on a scanning time of the laser light and an emitted position of the laser light in a sub-scanning direction perpendicular to the main scanning direction, which are measured on a plane, and information on a shape of the scanned surface.

According to another embodiment of the present invention, there is provided an image forming apparatus, including a photosensitive member including a scanned surface in a surface of the photosensitive member, a light source configured to emit laser light, a deflection unit configured to deflect the laser light emitted from the light source, and move a spot of the laser light emitted onto the scanned surface in a main scanning direction, to thereby form a scanning line, a storage unit configured to store information on a scanning time taken by the laser light to scan the scanned surface in order to form one scanning line, and a control unit configured to cause a latent image to be formed on the scanned surface, the control unit being further configured to calculate the scanning time stored in the storage unit based on information on a scanning time of the laser light and an emitted position of the laser light in a sub-scanning direction perpendicular to the main scanning direction, the laser light measured on a plane, and information on a shape of the scanned surface.

According to another embodiment of the present invention, there is provided a correction method for correcting a scanning line of an optical scanning device, the optical scanning device including a light source configured to emit laser light, and a deflection unit configured to deflect the laser light emitted from the light source, and move a spot of the laser light emitted onto a scanned surface in a main scanning direction, to thereby form the scanning line, the correction method including a first measurement process of measuring, by a first detection unit, an emitted position of the laser light emitted from the light source on a plane a second measurement process of measuring, by a second detection unit, a scanning time of the laser light emitted from the light source on the plane, a calculation process of calculating an error between the measured scanning time and a scanning time on the scanned surface based on the emitted position measured in the first measurement process, the scanning time measured in the second measurement process, and information on a shape of the scanned surface, and an adjustment process of adjusting a length of the scanning line based on the error calculated in the calculation process.

According to another embodiment of the present invention, there is provided an optical scanning device, including a light source configured to emit laser light, a deflection unit configured to deflect the laser light emitted from the light source, and move a spot of the laser light emitted onto a scanned surface in a main scanning direction, to thereby form a scanning line, and a storage unit configured to store information on an emitted position of the laser light in a sub-scanning direction perpendicular to the main scanning direction, the laser light measured on a plane, in which an emitted position for forming one scanning line is set based on the information on the measured emitted position, which is stored in the storage unit, and information on a shape of the scanned surface.

According to another embodiment of the present invention, there is provided an image forming apparatus, including a photosensitive member including a scanned surface in a surface of the photosensitive member, a light source configured to emit laser light, a deflection unit configured to deflect the laser light emitted from the light source, and move a spot of the laser light emitted onto the scanned surface in a main scanning direction, to thereby form a scanning line, a storage unit configured to store information on an emitted position of the laser light in a sub-scanning direction perpendicular to the main scanning direction, the laser light measured on a plane, and a control unit configured to cause a latent image to be formed on the scanned surface, the control unit being further configured to set an emitted position on the scanned surface in the sub-scanning direction, which is to be determined when the laser light is emitted onto the scanned surface, based on the information on the emitted position measured on the plane, which is read from the storage unit, and the information on the shape of the scanned surface.

According to another embodiment of the present invention, there is provided an optical scanning device, including a light source configured to emit laser light, a deflection unit configured to deflect the laser light emitted from the light source, and move a spot of the laser light emitted onto a scanned surface in a main scanning direction, to thereby form a scanning line, and a storage unit configured to store information on an emitted position on the scanned surface in a sub-scanning direction perpendicular to the main scanning direction for forming one scanning line, the information on the emitted position stored in the storage unit being calculated based on information on an emitted position of the laser light in the sub-scanning direction, the laser light measured on a plane, and information on a shape of the scanned surface.

According to another embodiment of the present invention, there is provided an image forming apparatus, including a photosensitive member including a scanned surface in a surface of the photosensitive member, a light source configured to emit laser light, a deflection unit configured to deflect the laser light emitted from the light source, and move a spot of the laser light emitted onto the scanned surface in a main scanning direction, to thereby form a scanning line, a storage unit configured to store information on an emitted position on the scanned surface in a sub-scanning direction perpendicular to the main scanning direction for forming one scanning line, and a control unit configured to cause a latent image to be formed on the scanned surface, the control unit being further configured to calculate the information on the emitted position stored in the storage unit based on information on an emitted position of the laser light in the sub-scanning direction, the laser light measured on a plane, and information on a shape of the scanned surface.

According to another embodiment of the present invention, there is provided a correction method for correcting a scanning line of an optical scanning device, the optical scanning device including a light source configured to emit laser light, and a deflection unit configured to deflect the laser light emitted from the light source, and move a spot of the laser light emitted onto a scanned surface in a main scanning direction, to thereby form a scanning line, the optical scanning device being configured to form a latent image corresponding to input image data on the scanned surface, the correction method including a measurement process of measuring, by a detection unit, an emitted position of the laser light emitted from the light source on a plane, a first calculation process of calculating an error between the measured emitted position and an emitted position on the scanned surface based on the emitted position measured in the measurement process and information on a shape of the scanned surface, a second calculation process of calculating the emitted position on the scanned surface based on the error calculated in the first calculation process, and a correction process of correcting the input image data based on the emitted position on the scanned surface calculated in the second calculation process.

Further features of the present invention will become apparent from the following description of exemplary embodiments with reference to the attached drawings.

BRIEF DESCRIPTION OF THE DRAWINGS

FIG. 8A is a flowchart for illustrating the image processing according to the second embodiment.

FIG. 8B is a flowchart for illustrating image processing according to a third embodiment of the present invention.

DESCRIPTION OF THE EMBODIMENTS

Now, modes for carrying out the present invention are described as embodiments in detail with reference to the accompanying drawings. Note that, in the following description, a direction in which laser light emitted from an optical scanning device scans a surface of the photosensitive drum is set as a main scanning direction and a Y-axis direction. Further, a rotational direction of the photosensitive drum, which is a direction perpendicular to the main scanning direction, is set as a sub-scanning direction and a Z-axis direction. In addition, a direction perpendicular to the main scanning direction (Y-axis direction) and the sub-scanning direction (Z-axis direction) is set as an X-axis direction.

(Deviation Between Scanning Line on Scanning Line Measuring Device and Scanning Line on Photosensitive Drum)

Figure 9A:
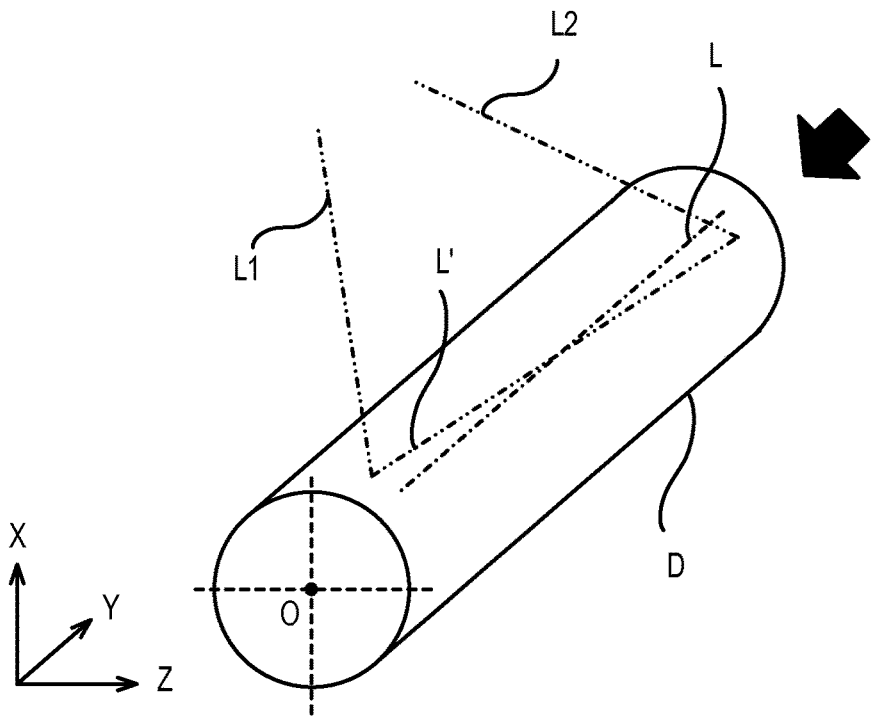
FIGS. 9A and 9B are diagrams for illustrating an emitted position of a scanning line tilted toward a sub-scanning direction according to the related art.
Figure 9B:
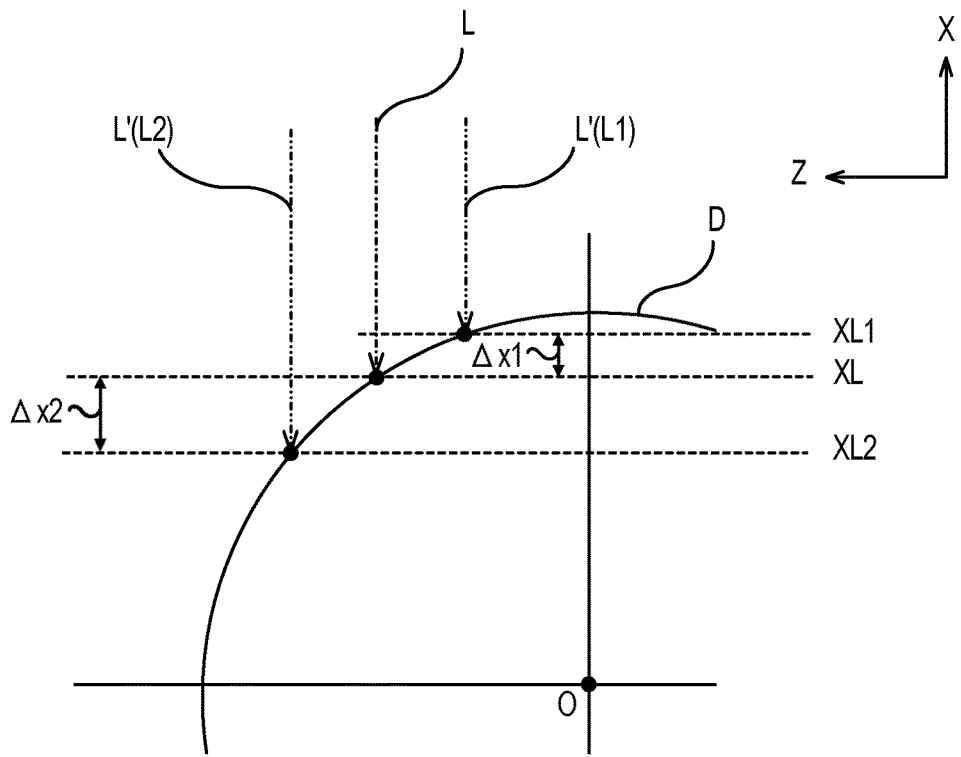

First, an emitted position measured by a scanning line measuring device in a manufacturing process and an actual emitted position on a photosensitive drum surface of an image forming apparatus are described with reference to FIGS. 9A and 9B. FIGS. 9A and 9B are explanatory diagrams of the laser light being emitted onto a photosensitive drum D. FIG. 9A is a perspective view for illustrating a relationship between the photosensitive drum D and the laser light emitted onto the photosensitive drum D, and FIG. 9B is a sectional view for illustrating a relationship between the photosensitive drum D, which is viewed from the arrow direction in FIG. 9A, and the laser light emitted onto the photosensitive drum D. In FIGS. 9A and 9B, a scanning line L indicated by an alternate long and short dash line is obtained when the emitted position of the laser light in the sub-scanning direction is in an ideal state in which a tilt or a bow does not occur. Further, a scanning line L' indicated by an alternate long and two short dashes line is obtained when the emitted position of the laser light in the sub-scanning direction exhibits a tilt. In addition, the photosensitive drum D is set to have a center O (0,0) in Z-X coordinates. Note that, the scanning line L' is emitted onto the photosensitive drum D within a range between a light flux L1 and a light flux L2.

As illustrated in FIG. 9B, the ideal scanning line L having no tilt or no bow does not cause a deviation in the sub-scanning direction, and is fixedly located at a position XL on an X-axis between the light flux L1 and the light flux L2. However, the scanning line emitted from the optical scanning device generally causes a deviation in the emitted position in the sub-scanning direction depending on an optical characteristic or mounting accuracy of a lens, and is emitted onto the photosensitive drum D in a state of being tilted toward the sub-scanning direction as indicated by L' in FIG. 9A. For example, it is assumed that the scanning line emitted from the optical scanning device is tilted toward the sub-scanning direction on the photosensitive drum D set as a scanned surface. In this case, the photosensitive drum D has a cylindrical shape as illustrated in FIG. 9A and FIG. 9B, and hence, as illustrated in FIG. 9B, the scanning line L' tilted toward the sub-scanning direction is located at a position XL1 on the X-axis with the light flux L1 and located at a position XL2 on the X-axis with the light flux L2, which inhibits the position on the X-axis from being fixed. Note that, also in the embodiments described below, the photosensitive drum D is assumed to have a cylindrical shape having substantially a circular cross section, but may be, for example, an image bearing member having another shape such as an image bearing member formed to into a belt shape.

In this case, when the emitted position of the scanning line is measured on the scanning line measuring device, a planar sensor is used for a measurement thereof, and emitted positions z1, z2, and z3 that are measured as described later are values measured on a plane. Therefore, positions on the X-axis corresponding to the light fluxes L1 and L2 are the position XL even when the emitted position of the tilted scanning line L' is measured. As a result, the emitted position measured on the scanning line measuring device and the emitted position where the scanning line is actually emitted onto the photosensitive drum D cause an error $\Delta x1$ with the light flux L1 and an error $\Delta x2$ with the light flux L2 on the X-axis. Then, the errors $\Delta x1$ and $\Delta x2$ become an optical path length difference of the laser light. As the radius of the photosensitive drum D decreases with downsizing of the image forming apparatus, influence exerted by the optical path length differences $\Delta x1$ and $\Delta x2$ become less negligible.

(Deviation Between Scanning Time on Scanning Line Measuring Device and Scanning Time on Photosensitive Drum)

Figure 10A:
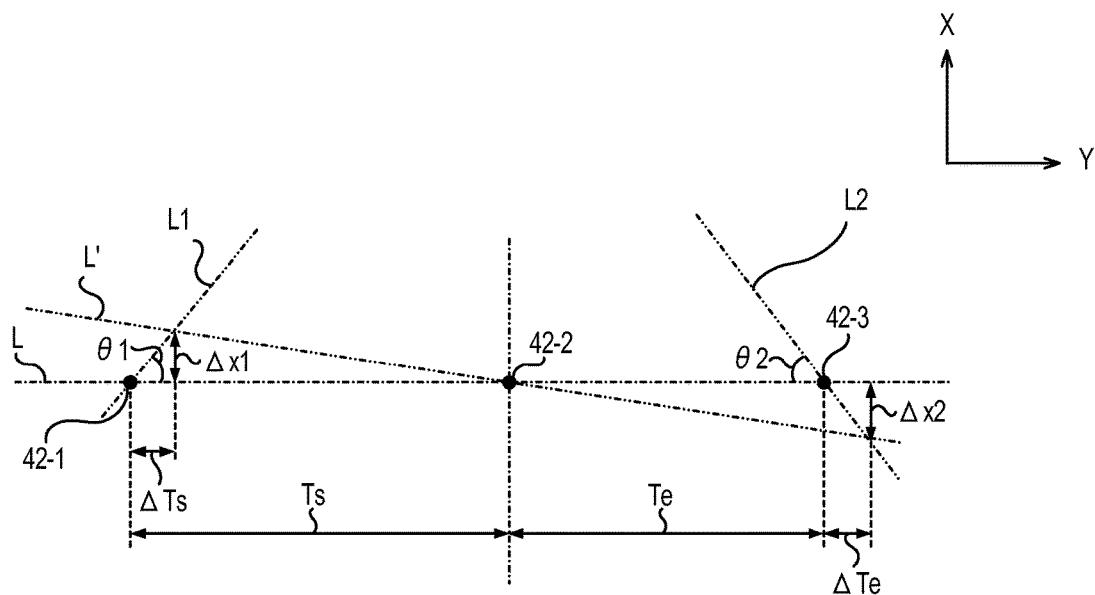
FIG. 10A is an explanatory diagram of scanning times on a scanning line measuring device and on a photosensitive drum surface according to the related art.

FIG. 10A is an explanatory diagram for illustrating a scanning time of the laser light in the manufacturing process. The scanning time taken by the optical scanning device in the main scanning direction is measured by arranging planar sensors on the scanned surface of the scanning line measuring device. For example, a plane sensor 42-2 is arranged on the scanned surface at a center thereof corresponding to a center of an image on the photosensitive drum D, and plane sensors 42-1 and 42-3 are arranged on the scanned surface in vicinities of both end portions thereof corresponding to both end portions of the image on the photosensitive drum D. Note that, the sensor on a side onto which the light flux L1 is emitted is set as the plane sensor 42-1, and the sensor on a side onto which the light flux L2 is emitted is set as the plane sensor 42-3. Further, a scanning time Is for a segment between the plane sensor 42-1 and the plane sensor 42-2 and a scanning time Te for a segment between the plane sensor 42-2 and the plane sensor 42-3 are measured.

For example, when the scanning line emitted from the optical scanning device is the scanning line L' tilted toward the sub-scanning direction on the scanned surface, the optical path length differences $\Delta x1$ and $\Delta x2$ occur. The optical path length differences $\Delta x1$ and $\Delta x2$ are differences between an ideal distance to the scanned surface in the case of the scanning line L exhibiting no tilt and distances to actual arrival positions on the surface of the photosensitive drum D at which the light fluxes L1 and L2 are emitted onto the plane sensors 42-1 and 42-3. In this case, it is assumed that the light flux L1 is emitted onto the scanned surface with an angle $\theta1$ of incidence in the main scanning direction, and the light flux L2 is emitted onto the scanned surface with an angle $\theta2$ of incidence in the main scanning direction, as illustrated in FIG. 10A. It is understood that, when the scanning times for the respective segments described above are calculated from the optical path length differences $\Delta x1$ and $\Delta x2$ and the angles $\theta1$ and $\theta2$ of incidence, deviations $\Delta Ts$ and $\Delta Te$ are caused with respect to the ideal scanning times Ts and Te for the two segments regarding the scanning line L exhibiting no tilt.

More specifically, when a scanning speed of the scanning line is set as S0, the scanning line L exhibiting no tilt scans the scanned surface by a distance of Ts×S0 during a time Ts. On the other hand, in the case of the light flux L1 of the scanning line L' exhibiting a tilt, the optical path length difference $\Delta x1$ is caused, and hence the distance for scanning the scanned surface during the time Ts becomes shorter than the scanning line L exhibiting no tilt by $\Delta Ts \times S0$. Therefore, intervals between light fluxes of the scanning line in the main scanning direction become shorter on the side of the light flux L1. Further, in the case of the light flux L2 of the scanning line L' exhibiting a tilt, the optical path length difference $\Delta x2$ is caused, and hence the distance for scanning the scanned surface during the time Te becomes longer than the scanning line L exhibiting no tilt by $\Delta Te \times S0$. Therefore, the intervals between light fluxes of the scanning line in the main scanning direction become longer on the side of the light flux L2.

Figure 10B:
FIG. 10B is an explanatory diagram of a one-side magnification difference of the scanning line.

In this case, a diagram indicating a printing width of the image obtained when the scanned surface is scanned by the scanning line L is illustrated in part (1) of FIG. 10B, and a diagram indicating a printing width of the image obtained when the scanned surface is scanned by the scanning line L' is illustrated in part (2) of FIG. 10B. As described above, the scanning times Is and Te for the two segments cause differences $\Delta Ts$ and $\Delta Te$ with respect to the image center, and hence a magnification of the scanning line is ideally supposed to be an equal magnification as illustrated in part (1) of FIG. 10B, but the magnification differs between on a left side and on a right side as illustrated in part (2) of FIG. 10B. A phenomenon that the magnification thus differs between on the left side and on the right side is referred to as "one-side magnification difference", and the scanning line L' tilted toward the sub-scanning direction has a problem of causing the one-side magnification difference with respect to the scanning line L exhibiting no tilt. Further, there is a fear that, when a plurality of scanning lines are superimposed on each other, accuracy of the emitted position in the main scanning direction may be degraded, and a color misregistration may be caused.

[First Embodiment]

(Description of Image Forming Apparatus)

Figure 1A:
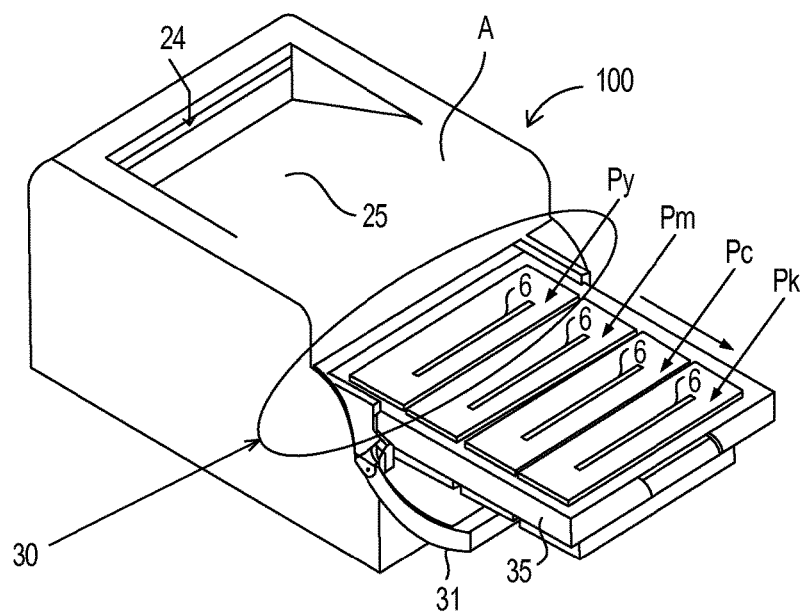
FIG. 1A is a schematic view for illustrating a configuration of a color image forming apparatus.
Figure 1B:
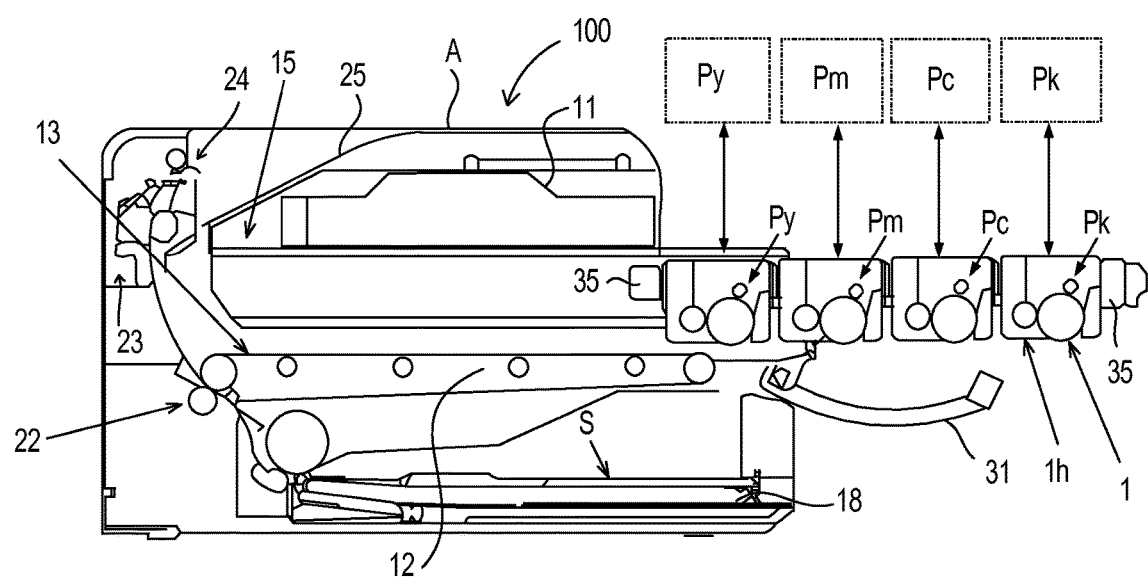
FIG. 1B is a sectional view for illustrating a configuration of the color image forming apparatus.

FIGS. 1A and 1B are a perspective view and a sectional view for illustrating a color image forming apparatus according to a first embodiment of the present invention. The color image forming apparatus (hereinafter referred to as "printer") 100 according to this embodiment is a four full-color laser printer employing an electrophotographic process. The printer 100 executes image formation for a recording medium S based on an electrical image signal input from an external host apparatus (not shown) such as a personal computer, an image reader, or a facsimile apparatus. Note that, the recording medium S is, for example, paper, an OHP sheet, or a label, and is hereinafter referred to as "sheet S".

FIG. 1A is an external perspective view of the printer 100 according to this embodiment. In FIG. 1A, a state in which a user has pulled out process cartridges Py, Pm, Pc, and Pk from a main body A of the printer 100 (hereinafter referred to simply as "main body A") is illustrated. FIG. 1B is a vertical sectional left side view of the printer 100. At a time of the image formation, a moving member 35 is received into a frame body of the main body A. In this case, in regard to the printer 100, a front side or a front surface side represents a side on which a door 31 is arranged as an opening and closing member with respect to an opening portion 30 of the main body A. A back side represents a side opposite to the side on which the door 31 is arranged. Forward and backward directions represent a direction from the back side of the main body A toward the front side (forward direction) and a direction opposite thereto (backward direction). The left side or the right side represents a left side or a right side of the main body A when viewed from the front side. Leftward and rightward directions represent a direction from the right side toward the left side (leftward direction) and a direction opposite thereto (rightward direction).

Inside the main body A of the printer 100, four process cartridges are arranged such that a first process cartridge Py, a second first process cartridge Pm, a third first process cartridge Pc, and a fourth process cartridge Pk (hereinafter referred to simply as "cartridges Py, Pm, Pc, and Pk") are aligned in a horizontal direction (lateral direction) from the back side toward the front side. Such a configuration is referred to as an in-line configuration or a tandem type. The cartridges Py, Pm, Pc, and Pk have the same configuration except in color of a developer (toner) contained therein. In this case, y represents a yellow color, m represents a magenta color, c represents a cyan color, and k represents a black color. In the following description, suffixes "y", "m", "c", and "k" representing the colors are omitted unless necessary.

The cartridge P according to this embodiment includes a photosensitive drum 1 as an image bearing member or a photosensitive member on which a latent image is to be formed. Further, as a process unit that acts on the photosensitive drum 1, the cartridge P includes a charging device as a charging unit, a developing device as a developing unit, and a cleaning device as a cleaning unit. Further, those members are integrally assembled into a cartridge frame body 1h of the cartridge P. The cartridge Py contains the toner of the yellow color (Y color), and a toner image of the y color is formed on a surface of a photosensitive drum 1y. The cartridge Pm contains the toner of the magenta color (M color), and a toner image of the m color is formed on a surface of a photosensitive drum 1m. The cartridge Pc contains the toner of the cyan color (C color), and a toner image of the c color is formed on a surface of a photosensitive drum 1c. The cartridge Pk contains the toner of the black color (Bk color), and a toner image of the Bk color is formed on a surface of a photosensitive drum 1k.

An optical scanning device 11 is arranged above the cartridge P. The optical scanning device 11 outputs a modulated light beam so as to correspond to image information on the respective colors input from the external host apparatus. Then, light beams Ly, Lm, Lc, and Lk output from the optical scanning device 11 each pass through an exposure window 6 formed to an upper surface of the cartridge frame body 1h, and the respective surfaces of the photosensitive drums 1y, 1m, 1c, and 1k of the respective cartridges Py, Pm, Pc, and Pk are exposed to the light beams Ly, Lm, Lc, and Lk.

An intermediate transferring belt unit 12 is arranged below the cartridge P. A lower surface of the photosensitive drum 1 included in the cartridge P is in contact with the intermediate transferring belt unit 12, and the toner image formed on the surface of the photosensitive drum 1 is transferred onto an intermediate transferring belt 13. The unfixed toner image transferred onto the intermediate transferring belt 13 is transferred by a transfer roller pair 22 onto the sheet S fed from a feeder unit 18 provided below the intermediate transferring belt unit 12. The sheet S having the toner image transferred thereon is sent to a fixing device 23, and after the unfixed toner image on the sheet S is fixed to the sheet S by heat and pressure, delivered by a delivery roller pair 24 to a delivery tray 25 formed to an upper surface of the main body A. Note that, a temperature sensor 15 is mounted inside the printer 100 as a temperature detection unit configured to detect a temperature inside the printer 100. The temperature sensor 15 is used to, for example, detect the temperature inside the printer 100 that has increased due to an operation of the printer 100, and feedback-control a fixing condition such as a fixing temperature of the fixing device 23 based on the detected temperature.

(Description of Optical Scanning Device)

Figure 2A:
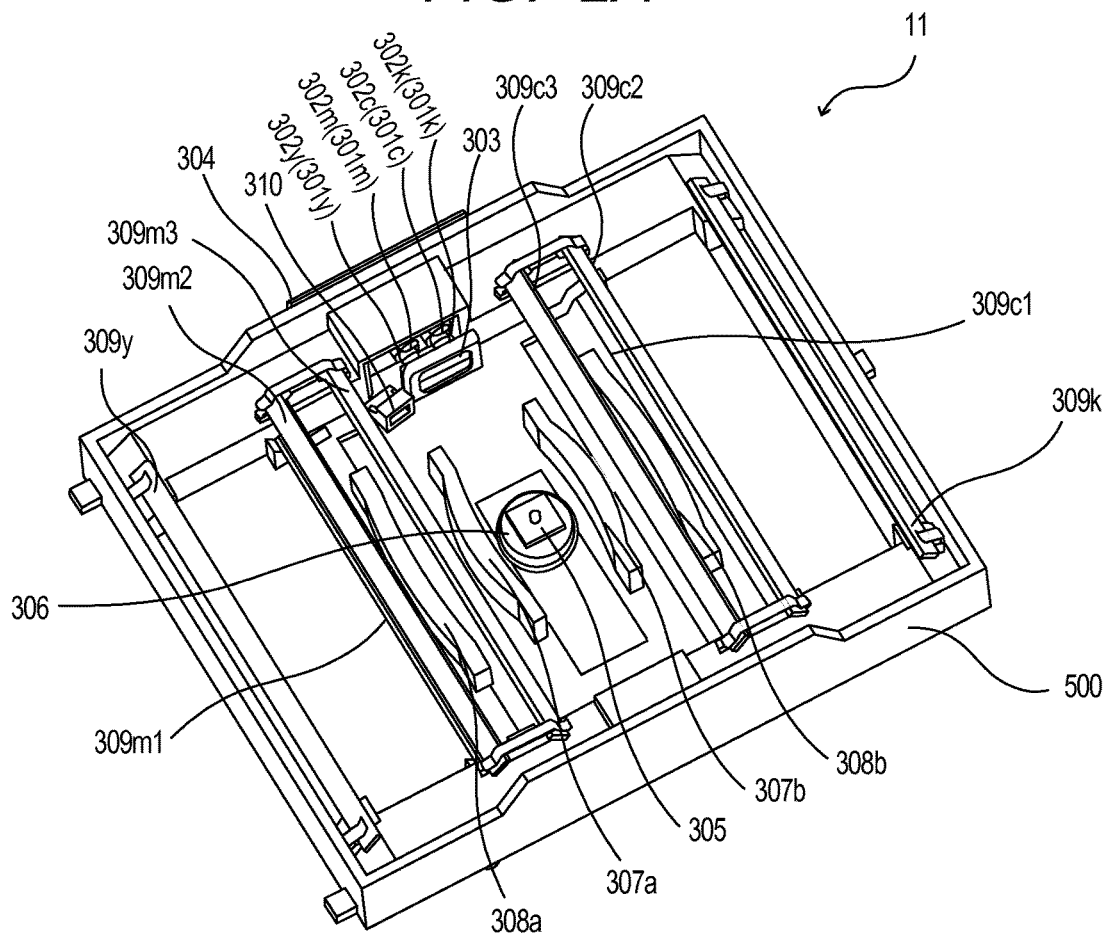
FIG. 2A is a perspective view of an optical scanning device.
Figure 2B:
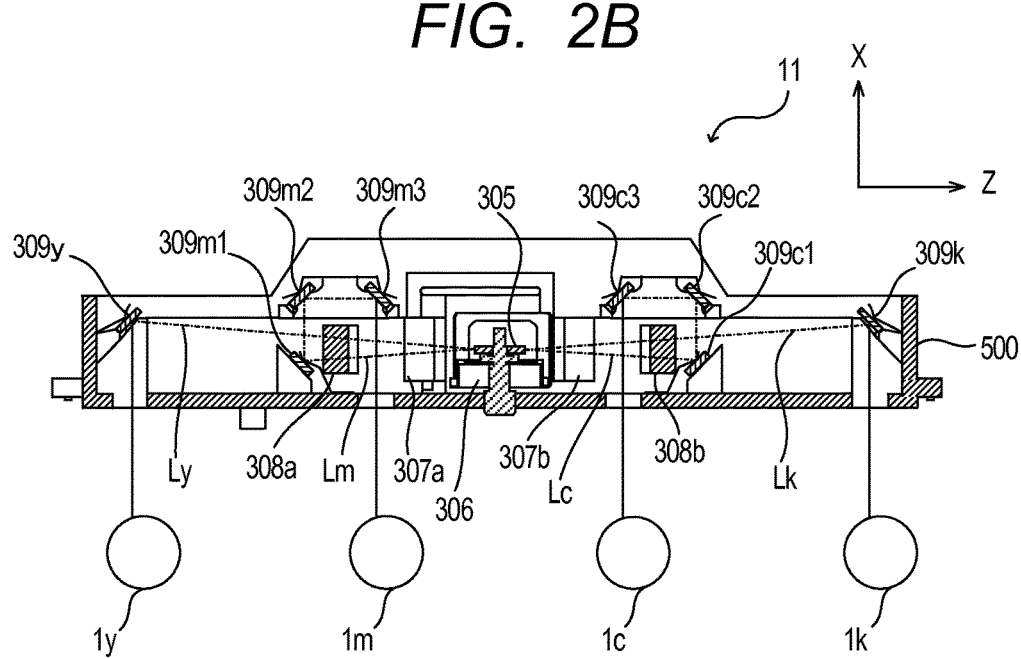
FIG. 2B is a sectional view of the optical scanning device.

FIG. 2A is a perspective view of the optical scanning device 11, and FIG. 2B is a sectional view of the optical scanning device 11. Note that, also in the description of FIG. 2A, the suffixes "y", "m", "c", and "k" representing the colors are omitted unless necessary. A light source unit 302 includes a semiconductor laser as a light source corresponding to each of the colors and a collimator lens 301. The collimator lens 301 is a lens configured to change each laser light L emitted from the semiconductor laser into a predetermined shape. A compound-eye cylindrical lens 303 is a lens configured to image the laser light emitted through the collimator lens 301 onto a rotary polygonal mirror 305 described later in a focal-line shape. A laser driving circuit substrate 304 is a substrate configured to drive and control the semiconductor laser. Note that, the laser driving circuit substrate 304 includes a storage unit 350 as a storage unit described later. The storage unit 350 is, for example, a nonvolatile memory. A deflector 306 provided as a rotation unit includes the rotary polygonal mirror 305 described later and a scanner motor (not shown) configured to drive the rotary polygonal mirror 305.

The rotary polygonal mirror 305 includes a plurality of (four in FIG. 2A) reflection surfaces in vicinities of a line image of a light flux condensed by the compound-eye cylindrical lens 303. For example, fθ lenses 307a and 307b and scanning lenses 308a and 308b are each formed of a toric lens. The fθ lenses 307a and 307b and the scanning lenses 308a and 308b cause the light flux reflected by the reflection surface of the rotary polygonal mirror 305 to be condensed so as to form a spot on the surfaces of the photosensitive drums 1y, 1m, 1c, and 1k described later. Further, the fθ lenses 307a and 307b and the scanning lenses 308a and 308b are designed so that, when the laser light scans the surface of the photosensitive drum 1 provided as a member to be scanned (surface of the image bearing member or surface of the member to be scanned), a scanning speed of the spot formed on each of the surfaces of the photosensitive drums 1y, 1m, 1c, and 1k maintains a constant speed.

Reflective mirrors 309y, 309m1, 309m2, 309m3, 309c1, 309c2, 309c3, and 309k are mirrors configured to guide the laser light used for the scanning onto the photosensitive drum 1. A condensing lens 310 is a lens configured to guide the laser light to a beam detect sensor (hereinafter referred to as "BD sensor") (not shown) provided on the laser driving circuit substrate 304 as a horizontal synchronous signal detection unit. An optical box 500 is a box configured to receive an optical scanning system subjected to counter scanning by the deflector 306. The above-mentioned optical parts are built into the optical box 500, and the optical box 500 is substantially enclosed with a lid (not shown) from a viewpoint of prevention of dust intrusion or the like, to integrally form the optical scanning device 11. Further, the optical scanning device 11 is mounted to the printer 100 provided as an image forming apparatus as illustrated in FIG. 1A and FIG. 1B.

As illustrated in FIG. 2B, laser lights Ly, Lm, Lc, and Lk emitted from the semiconductor laser of the light source unit 302 pass through the compound-eye cylindrical lens 303, to be subjected to the counter scanning in mutually different directions by the rotary polygonal mirror 305. The laser lights Ly and Lm and the laser lights Lc and Lk, which are subjected to the scanning by the rotary polygonal mirror 305, are transmitted through the fθ lens 307a and the scanning lens 308a and the fθ lens 307b and the scanning lens 308b, respectively. The laser lights Ly, Lm, Lc, and Lk transmitted through the fθ lenses 307a and 307b and the scanning lenses 308a and 308b are redirected by the reflective mirrors 309y, 309m1, 309m2, 309m3, 309c1, 309c2, 309c3, and 309k. The fθ lenses 307a and 307b, the scanning lenses 308a and 308b, and the reflective mirrors 309y, 309m1, 309m2, 309m3, 309c1, 309c2, 309c3, and 309k are optical members each configured to guide the laser light L deflected by the rotary polygonal mirror 305 onto the photosensitive drum 1. Thus, the laser lights Ly, Lm, Lc, and Lk scan the surfaces of the photosensitive drums 1y, 1m, 1c, and 1k, respectively, of the respective colors.

In this manner, the optical scanning system guides the laser light L onto the four photosensitive drums 1, to conduct the image formation. The laser lights Ly, Lm, Lc, and Lk to be imaged on the photosensitive drums 1 are each subjected to the scanning in a rotational direction of the rotary polygonal mirror 305 (main scanning direction), to thereby form a scanning line. Then, the photosensitive drums 1y, 1m, 1c, and 1k are each rotated (in the sub-scanning direction), to thereby form an electrostatic latent image on the surface of the photosensitive drum 1.

Further, the laser light Ly emitted from the semiconductor laser corresponding to the photosensitive drum 1y passes through the condensing lens 310 on an upstream side of a position where the laser light Ly is deflected and emitted onto the fθ lens 307a by the rotary polygonal mirror 305, to be guided to the BD sensor by the condensing lens 310. With this arrangement, an image writing timing is obtained. Note that, the optical scanning device 11 according to this embodiment includes the condensing lens 310 and the BD sensor only on a side of the semiconductor laser corresponding to the photosensitive drum 1y. Light emissions of the semiconductor laser corresponding to the other colors are electrically controlled so as to attain positions for writing the respective colors.

(Measurement of Emitted Position Conducted by Scanning Line Measuring Device)

Figure 3A:
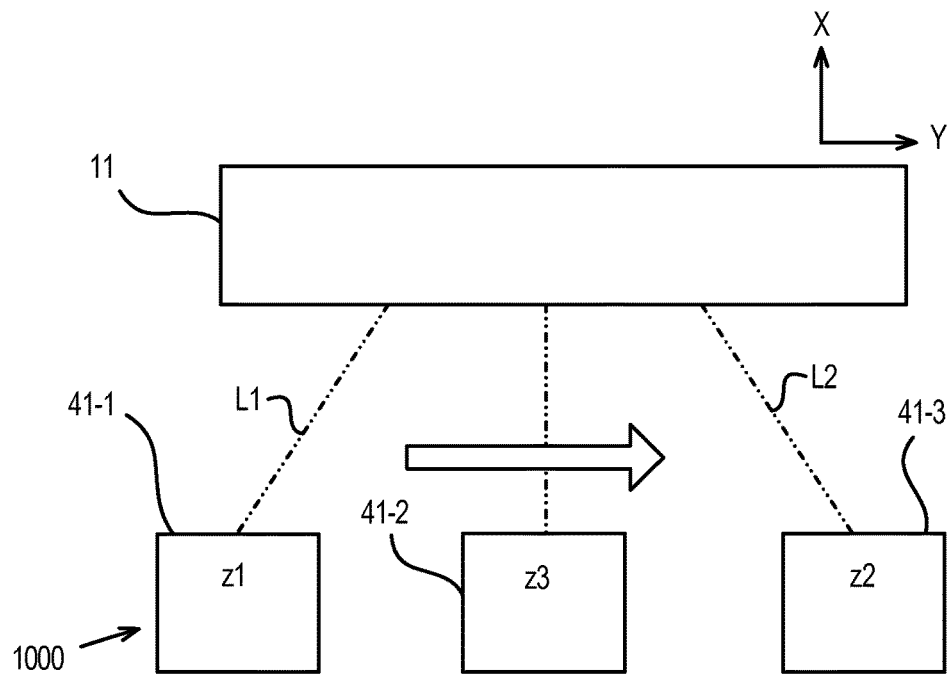
FIG. 3A and FIG. 3B are diagrams for illustrating a positional relationship in a main scanning direction between the optical scanning device and a scanning line measuring device.
Figure 3B:
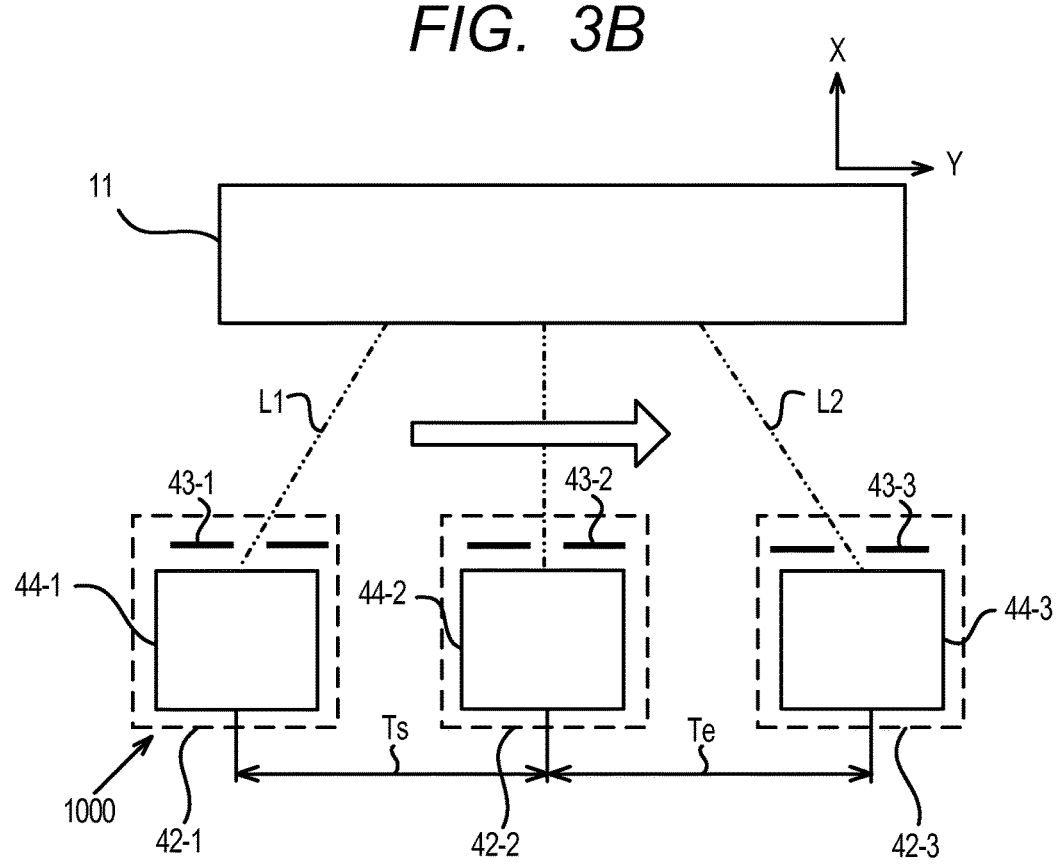

In FIGS. 3A and 3B, a positional relationship between a scanning line measuring device 1000 described later with reference to FIG. 5 and the optical scanning device 11 is illustrated. In the scanning line measuring device 1000, the plane sensors 42-1, 42-2, and 42-3 and sensors 41-1, 41-2, and 41-3 for measurement configured to measure a scanning line position of the optical scanning device 11 are arranged.

FIG. 3A is a diagram for illustrating the sensors 41-1, 41-2, and 41-3 for measurement, and FIG. 3B is a diagram for illustrating the plane sensors 42-1, 42-2, and 42-3.

The sensors 41-1, 41-2, and 41-3 for measurement are arranged at positions spaced apart from the optical scanning device 11 by a predetermined distance so as to establish an actual positional relationship between the optical scanning device 11 and the photosensitive drum 1 of the printer 100 to which the optical scanning device 11 is mounted. Further, the sensor 41-2 for measurement is arranged at a position corresponding to a center of the image formed on the actual photosensitive drum 1 in the main scanning direction (hereinafter referred to as "image center"). Note that, the image center is referred to also as "0-mm image height". In this case, the image height represents a position in the main scanning direction obtained when the optical scanning device 11 and the photosensitive drum 1 are arranged at the positions spaced apart from each other by the above-mentioned predetermined distance, and is expressed as 0 mm at the image center, a minus value on an upstream side in the main scanning direction, and a plus value on a downstream side in the main scanning direction.

Further, the sensor 41-1 for measurement is arranged at a position corresponding to a vicinity of an end portion of the image formed on the actual photosensitive drum 1 on the upstream side in the main scanning direction. Note that, the position where the sensor 41-1 for measurement is arranged is referred to also as "−100-mm image height". In addition, the sensor 41-3 for measurement is arranged at a position corresponding to a vicinity of an end portion of the image formed on the actual photosensitive drum 1 on the downstream side in the main scanning direction. Note that, the position where the sensor 41-3 for measurement is arranged is referred to also as "+100-mm image height". In this embodiment, the image heights at which the sensors 41-1 and 41-3 for measurement are arranged are set to ±100 mm. However, those values are determined depending on a length in the main scanning direction of the sheet S, which is usable for the printer 100 to which the optical scanning device 11 is mounted, and are not limited to ±100 mm.

In this manner, for the measurement of the scanning line to be conducted by the scanning line measuring device 1000 according to this embodiment, the sensors 41-1, 41-2, and 41-3 for measurement configured to measure the emitted position of the scanning line in the sub-scanning direction are provided at three positions in the main scanning direction. The sensors 41-1, 41-2, and 41-3 for measurement are, for example, line sensors, each of which is arranged such that a longitudinal direction in which light receiving elements of the line sensor are aligned is perpendicular to the main scanning direction and parallel with the sub-scanning direction. This allows the emitted position in the sub-scanning direction at each of the image heights to be detected by detecting which of the light receiving elements of the line sensor the laser light has been emitted onto. The sensors 41-1, 41-2, and 41-3 for measurement are hereinafter referred to as "line sensors 41-1, 41-2, and 41-3". The line sensors 41-1, 41-2, and 41-3 are provided so as to correspond to each of the laser lights Ly, Lm, Lc, and Lk, but the same processing is conducted for each of the laser lights, and the following description is directed to one laser light. The laser light emitted from the optical scanning device 11 is subjected to the scanning from a −100-mm image height side to a +100-mm image height side.

In the measurement of the emitted position in the sub-scanning direction conducted by the scanning line measuring device 1000, the emitted position z1 at the −100-mm image height is measured by the line sensor 41-1. Further, the emitted position z3 at the 0-mm image height is measured by the line sensor 41-2, and the emitted position z2 at the +100-mm image height is measured by the line sensor 41-3. In this embodiment, in the manufacturing process, the emitted positions z1, z2, and z3 measured by the scanning line measuring device 1000 are used to calculate the tilt and the bow of the scanning line, and light emission timing is controlled based on processing for image data, to thereby correct distortion of the image.

As illustrated in FIG. 3B, the plane sensors 42-1, 42-2, and 42-3 are used for the measurement of the scanning line in the main scanning direction indicated by the arrow in FIG. 3B. The plane sensor 42-1 includes a slit 43-1 and a photodiode 44-1, the plane sensor 42-2 includes a slit 43-2 and a photodiode 44-2, and the plane sensor 42-3 includes a slit 43-3 and a photodiode 44-3. In this embodiment, the time (hereinafter referred to as "scanning time") Ts elapsed after the light flux L1 is detected by the plane sensor 42-1 at the emitted position z1 at the −100-mm image height until the light beam is detected by the plane sensor 42-2 at the emitted position z3 at the 0-mm image height is measured. Further, the scanning time Te elapsed after the light beam is detected by the plane sensor 42-2 at the emitted position z3 at the 0-mm image height until the light flux L2 is detected by the plane sensor 42-3 at the emitted position z2 at the +100-mm image height is measured.

(Emitted Position and Scanning Time Obtained when Scanning Line Exhibits Tilt)

Figure 4A:
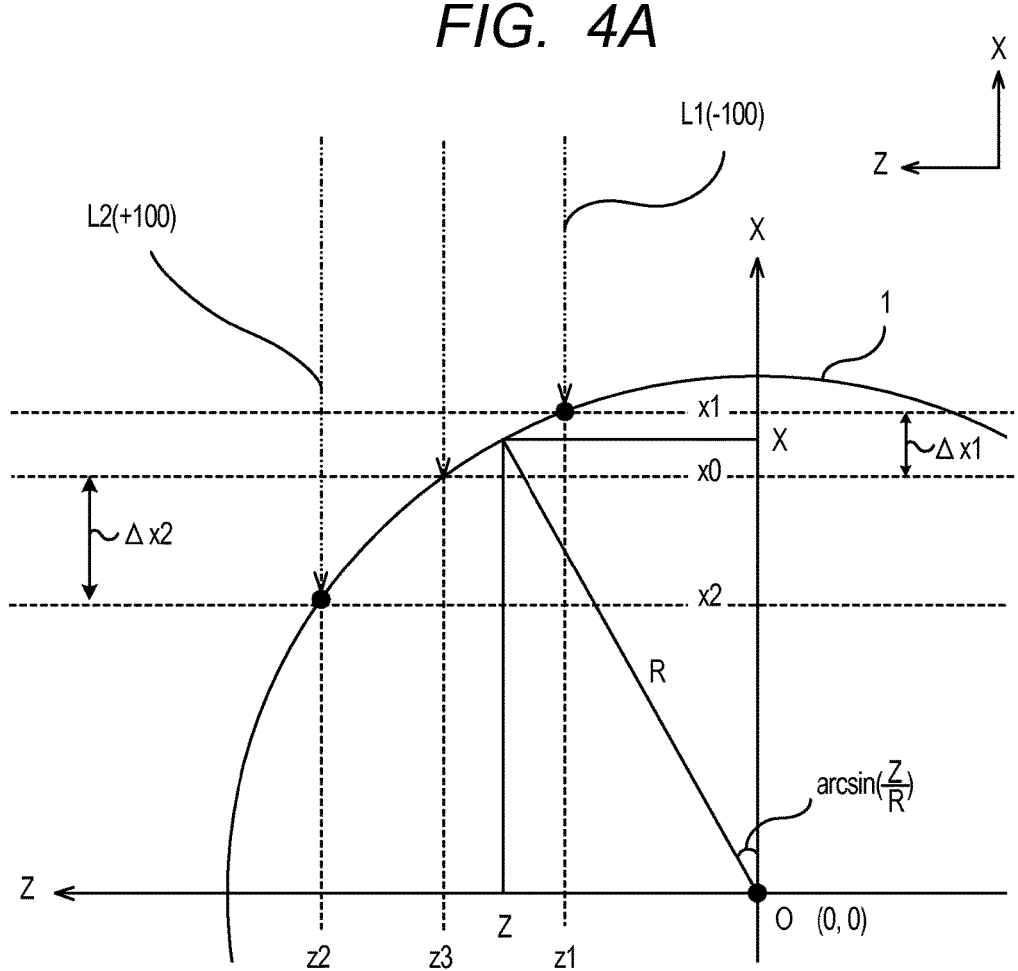
FIG. 4A is a sectional view for illustrating a relationship between a photosensitive drum and a light beam according to a first embodiment of the present invention.
Figure 4B:
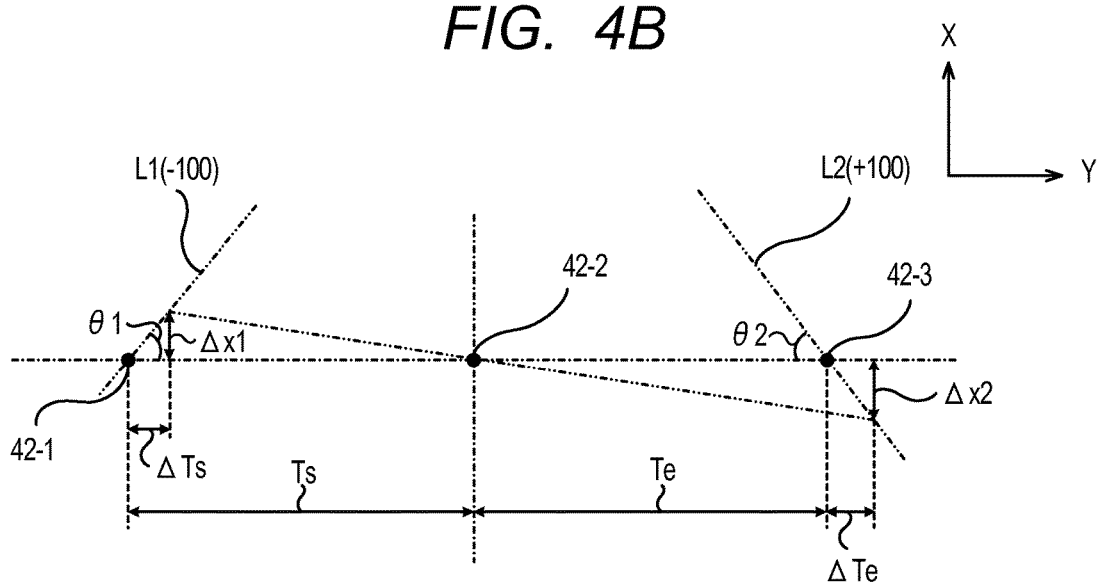
FIG. 4B is a diagram for illustrating a relationship between an emitted position and a scanning time of a scanning line.

In FIGS. 4A and 4B, the emitted position and the scanning time on the photosensitive drum 1, which are obtained when the scanning line is tilted toward the sub-scanning direction, are illustrated. FIG. 4A is a sectional view for illustrating a relationship between the photosensitive drum 1 and the laser light emitted onto the photosensitive drum 1, which is viewed from the same direction as FIG. 9B. FIG. 4B is an explanatory diagram for illustrating a relationship between the emitted position of the scanning line and the scanning time taken therefor, which is viewed from a plus side in the Z-axis direction. In this case, the photosensitive drum 1 is set to have a radius R, and a predetermined emitted position Z is set on the photosensitive drum 1. Assuming that the center O of the photosensitive drum 1 is positioned at coordinates (0,0), X with respect to the predetermined emitted position Z (hereinafter, Z is set as a reference position) is expressed by the following expression.

$$X = R \times \cos(\arcsin(Z/R)) \quad (1)$$

Further, a difference between an actual optical path length and an ideal (namely, in a case of a plane) optical path length to the surface of the photosensitive drum 1 at each of the image heights is expressed as the following expressions based on Expression (1).

z3: an ideal emitted position
x0: an X-coordinate of the emitted position z3 on the surface of the photosensitive drum 1
x1: an X-coordinate of the emitted position at the −100-mm image height
x2: an X-coordinate of the emitted position at the +100-mm image height
Δx1: a difference between the optical path length and the ideal optical path length (optical path length difference) at the emitted position at the −100-mm image height
Δx2: a difference between the optical path length and the ideal optical path length (optical path length difference) at the emitted position at the +100-mm image height $$\Delta x1 = x0 - x1 \quad (2)$$
$$= R \times \cos(\arcsin(z3/R)) - R \times \cos(\arcsin(z1/R))$$

$$\Delta x2 = x0 - x2 \quad (3)$$
$$= R \times \cos(\arcsin(z3/R)) - R \times \cos(\arcsin(z1/R))$$

Next, a deviation amount of the scanning time for each predetermined segment that occurs due to the deviation of the optical path length of the light beam can be expressed by the following expressions. Note that, the angle of incidence of the laser light emitted onto the photosensitive drum 1 is 90° with regard to a tangential plane at the emitted position at the 0-mm image height, and does not deviate in the main scanning direction even when the optical path length varies.
θ1: the angle of incidence of the light flux L1 with respect to the surface of the photosensitive drum 1 at the emitted position at the −100-mm image height
θ2: the angle of incidence of the light flux L2 with respect to the surface of the photosensitive drum 1 at the emitted position at the +100-mm image height
ΔT1: a distance based on the deviation amount of the scanning time for a segment between the −100-mm image height and the 0-mm image height
ΔT2: a distance based on the deviation amount of the scanning time for a segment between the 0-mm image height and the +100-mm image height $$\Delta T1 = \Delta x1 / \tan \theta1 \quad (4)$$

$$\Delta T2 = \Delta x2 / \tan \theta2 \quad (5)$$

In this case, when the scanning speed of the laser light scanning the scanned surface is set as S0, correction amounts ΔTs and ΔTe of the scanning times Is and Te are expressed by the following expressions.

$$\Delta Ts = -(\Delta T1/S0) \quad (6)$$

$$\Delta Te = -(\Delta T2/S0) \quad (7)$$

The reason that the minus sign is used above is described below.

Specifically, as described above, the scanning line L' exhibiting a tilt causes the optical path length difference Δx1 with the light flux L1, and therefore has a shorter distance for scanning the surface of the photosensitive drum 1 than the scanning line L exhibiting no tilt by ΔT1 during the time Ts, which causes a shortage in the scanning distance on the photosensitive drum 1. Therefore, the scanning needs to be conducted for a longer time by a time (ΔT1/S0) corresponding to the shortage in the scanning distance, namely, the scanning time needs to be increased. On the other hand, the scanning line L' exhibiting a tilt causes the optical path length difference Δx2 with the light flux L2, and therefore has a longer distance for scanning the scanned surface than the scanning line L exhibiting no tilt by ΔT2 during the time Te, which causes an increase in the scanning distance on the photosensitive drum 1. Therefore, the scanning needs to be conducted for a shorter time by a time (ΔT2/S0) corresponding to the increase in the scanning distance, namely, the scanning time needs to be decreased. In this manner, the scanning time on the photosensitive drum 1 needs to be decreased when the scanning distance on the photosensitive drum 1 in the main scanning direction is increased (ΔT1, ΔT2>0). In contrast, the scanning time on the photosensitive drum 1 needs to be increased when the scanning distance is decreased (ΔT1<0, ΔT2<0).

Based on the above-mentioned arithmetic operations, the actual scanning times to be used for correcting the image data are expressed as Ts' and Te'.

$$Ts' = Ts + \Delta Ts \quad (8)$$

$$Te' = Te + \Delta Te \quad (9)$$

The actual scanning times Ts' and Te' on the surface of the photosensitive drum 1 taken by the laser light, which are obtained by Expression (8) and Expression (9), are set by being subjected to the arithmetic operation for each scanning line. Then, the scanning times Ts' and Te' for a predetermined segment from z1 to z3 and a predetermined segment from z3 to z2, which correspond to information on the emitted positions z1, z2, and z3, are written to the storage unit 350 of the optical scanning device 11.

The optical scanning device 11 is mounted to the printer 100, and at the time of the image formation, a control unit (CPU 106 of a processing unit 105 described in a second embodiment of the present invention) of the printer 100 reads information on the scanning times Ts' and Te' from the storage unit 350 of the optical scanning device 11. Then, the control unit of the printer 100 adjusts a frequency of an image clock to be used to process the image data input for generating an image signal. This allows a magnification error of the scanning line in the main scanning direction (one-side magnification difference) to be adjusted, and allows the printing width of the image to match an actual width of the image.

(Block Diagram of Scanning Line Measuring Device)

Figure 5:
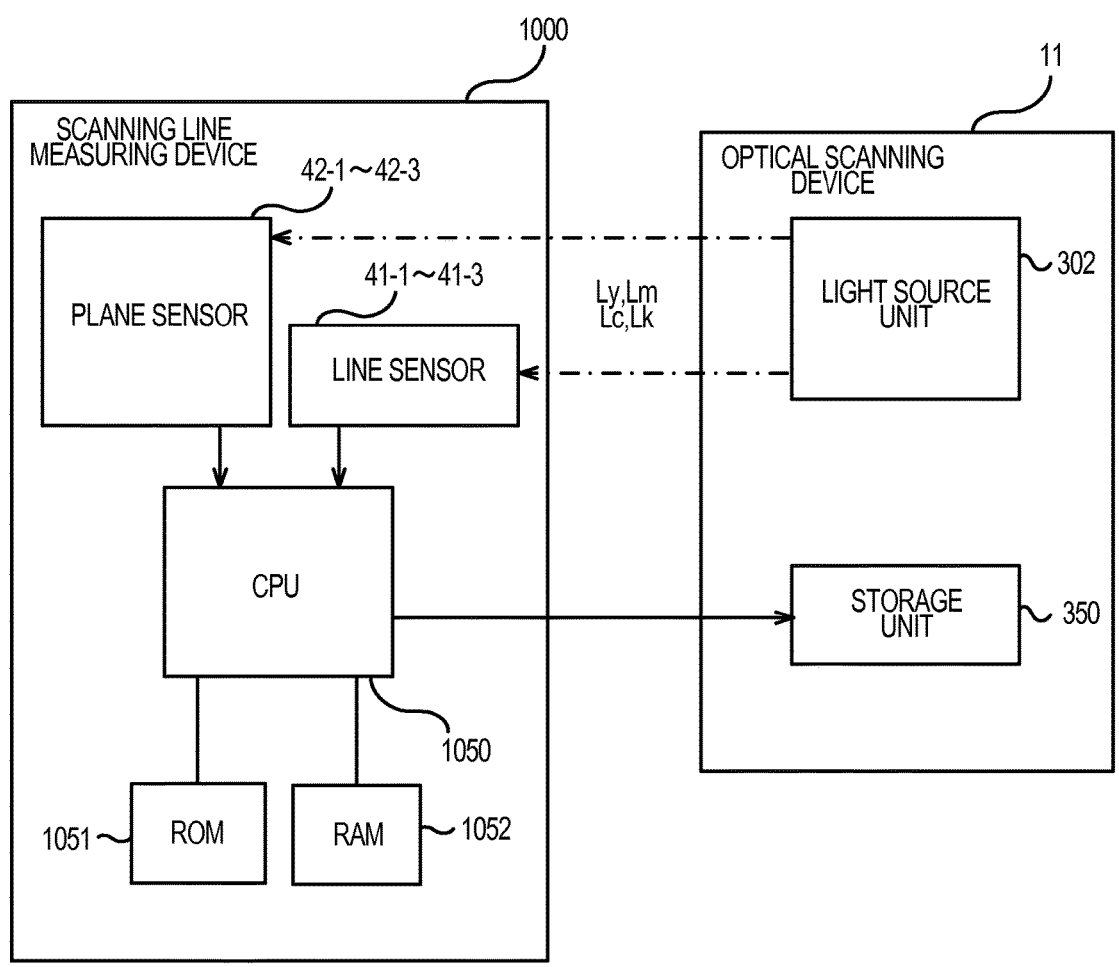
FIG. 5 is a block diagram of a scanning line measuring device and an optical scanning device according to the first embodiment.

FIG. 5 is a block diagram of the scanning line measuring device 1000. The scanning line measuring device 1000 includes the line sensors 41-1, 41-2, and 41-3 and the plane sensors 42-1, 42-2, and 42-3, which are described above, and also includes a CPU 1050, a ROM 1051, and a RAM 1052. The CPU 1050 executes various kinds of processing by using the RAM 1052 as a work area in accordance with various programs stored in the ROM 1051. The CPU 1050 causes the line sensors 41-1, 41-2, and 41-3 to measure the emitted positions z1, z2, and z3 of the laser light emitted from the optical scanning device 11. Further, the CPU 1050 causes the plane sensors 42-1, 42-2, and 42-3 to measure the scanning times Ts and Te of the laser light emitted from the optical scanning device 11. Note that, the CPU 1050 measures the emitted positions z1, z2, and z3 and the scanning times Ts and Te on the scanning line measuring device 1000 for each of the colors (four colors in this embodiment).

The CPU 1050 uses Expression (1) to Expression (7) to calculate the correction values ΔTs and ΔTe from the emitted positions z1, z2, and z3 and the scanning times Ts and Te, which have been measured, and uses Expression (8) and Expression (9) to calculate the actual scanning times Ts' and Te' from the calculated correction values ΔTs and ΔTe. Then, the CPU 1050 stores the information on the calculated actual scanning times Ts' and Te' into the storage unit 350 provided as the storage unit included in the optical scanning device 11. Note that, information on the radius R of the photosensitive drum 1, the angles θ1 and θ2 of incidence, and the scanning speed S0 is assumed to be stored in advance in the ROM 1051 of the scanning line measuring device 1000. Further, as the radius R of the photosensitive drum 1 stored in the ROM 1051, the information corresponding to the number of colors (for example, four colors) to be subjected to the scanning by the optical scanning device 11 is assumed to be stored. In addition, in this embodiment, the radius R of a circular arc surface being the surface of the photosensitive drum 1 is used as information on the shape of the photosensitive drum 1 provided as the image bearing member, but another physical quantity such as a curvature may be used as the information on the shape of the image bearing member.

(Measurement of Emitted Position and Scanning Time at Each Image Height Conducted by Scanning Line Measuring Device)

Figure 6A:
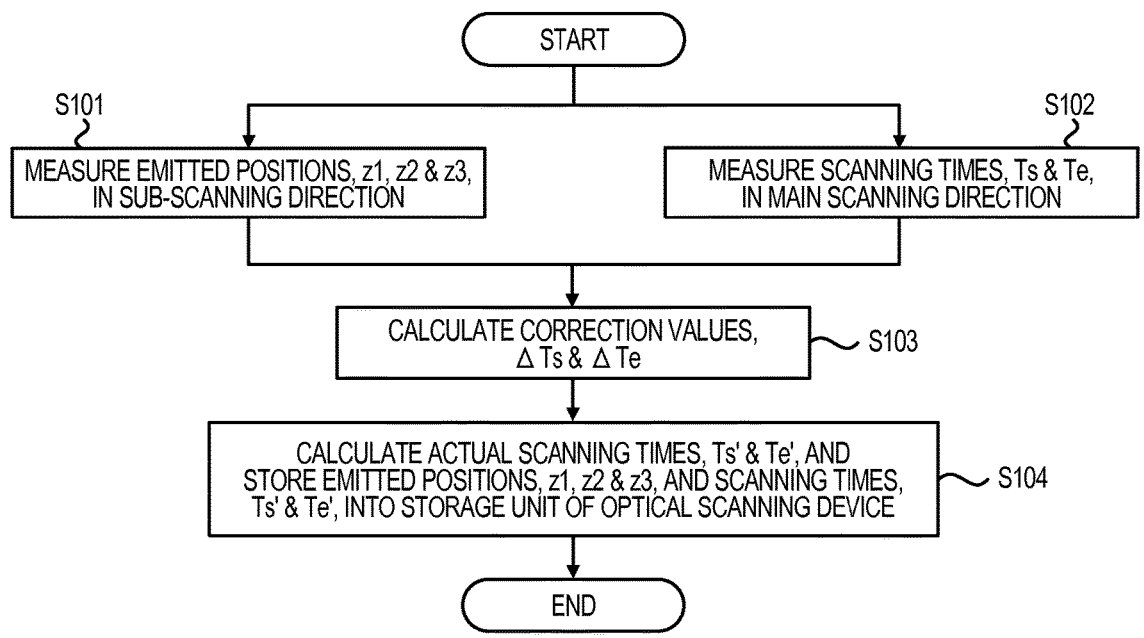
FIG. 6A is a flowchart for illustrating measurement processing for the emitted position and the scanning time of the scanning line according to the first embodiment.

FIG. 6A is a flowchart for illustrating processing executed by the CPU 1050 of the scanning line measuring device 1000 in the manufacturing process. When the optical scanning device 11 is placed above the scanning line measuring device 1000 as a measurement target, the measurement of the emitted position of the laser light on the scanning line measuring device 1000 and the scanning time taken by the laser light is started. Note that, the measurement conducted for one color is illustrated in FIG. 6A, and the measurement is assumed to be conducted the number of times corresponding to the four colors in actuality. In Step S101, the CPU 1050 causes the line sensors 41-1, 41-2, and 41-3 to measure the emitted positions z1, z2, and z3 of the laser light emitted from the optical scanning device 11 at the respective image heights in the sub-scanning direction.

In Step S102, the CPU 1050 causes the plane sensors 42-1, 42-2, and 42-3 to measure the scanning time Ts for a segment between the emitted position z1 and the emitted position z3 and the scanning time Te for a segment between the emitted position z3 and the emitted position z2. Note that, the processing of Step S101 and the processing of Step S102 are executed in parallel with each other, and are therefore represented as in FIG. 6A. In Step S103, the CPU 1050 calculates the correction values ΔTs and ΔTe from the emitted positions z1, z2, and z3, the scanning times Ts and Te, the radius R of the photosensitive drum 1, the angles θ1 and θ2 of incidence, and the scanning speed S0. In this case, the emitted positions z1, z2, and z3 indicate the emitted positions on the scanning line measuring device 1000 measured in Step S101. Further, the scanning times Ts and Te are the scanning times measured in Step S102. In addition, the radius R of the photosensitive drum 1, the angles θ1 and θ2 of incidence, and the scanning speed S0 are the values read from the ROM 1051. In Step S104, the CPU 1050 calculates the actual scanning times Ts' and Te' on the photosensitive drum 1 from the correction values ΔTs and ΔTe calculated in Step S103. The CPU 1050 stores the information on the calculated actual scanning times Ts' and Te' and the measured emitted positions z1, z2, and z3 into the storage unit 350 of the optical scanning device 11, to bring the processing to an end. In this manner, the one-side magnification difference on the surface of the photosensitive drum 1 in the main scanning direction is corrected with high accuracy, and the color misregistration is suppressed by reducing a magnification error in the main scanning direction, to thereby allow an improvement in image quality. Note that, instead of by adjustment and changing of the frequency of the image clock, the correction of the length of the scanning line (magnification error in the main scanning direction) may be realized by the control unit of the printer 100 changing and adjusting a pixel count of one scanning line (one line).

As described above, this embodiment allows the magnification error in the main scanning direction to be reduced with an inexpensive configuration while realizing downsizing of an apparatus.

[Second Embodiment]

In the second embodiment, there is described an example of using the information on the emitted positions z1, z2, and z3 and the scanning times Is and Te, which are stored in the storage unit 350 of the optical scanning device 11 by the scanning line measuring device 1000 described in the first embodiment, and the information on the temperature detected by the temperature sensor 15. Note that, the same components as those of the first embodiment are denoted by the same reference symbols, and descriptions thereof are omitted.

(Temperature Sensor)

In regard to the printer 100, the operation of the printer 100 causes an increase in a temperature of the optical scanning device 11 itself or the temperature inside a main body of the printer 100. There is a fear that the increase in the temperature of the optical scanning device 11 or the temperature inside the printer 100 may cause heat deformation of the optical box 500 of the optical scanning device 11. There is also a fear that such a phenomenon may occur that the fθ lens 307a or 307b or the scanning lens 308a or 308b is thermally expanded or a posture of the reflective mirror 309y, 309m1, 309m2, 309m3, 309c1, 309c2, 309c3, or 309k is changed. Due to those factors, the scanning line may change particularly in the emitted position in the sub-scanning direction. In other words, the increase in the temperature of the optical scanning device 11 or the temperature inside the printer 100 correlates with the deviation in the emitted position of the scanning line in the sub-scanning direction.

Therefore, the processing unit 105 configured to conduct image processing predicts the values of the emitted positions z1 and z2 based on the temperature detected by the temperature sensor 15 inside the printer 100. Specifically, the emitted positions z1 and z2 that are measured by the line sensors 41-1, 41-2, and 41-3 of the scanning line measuring device 1000 are subjected to a correction based on the temperature detected by the temperature sensor 15, to newly obtain the emitted positions z1 and z2. The emitted positions z1 and z2 that have been newly obtained through the correction based on a detection result from the temperature sensor 15 are regarded also as values predicted based on the detection result from the temperature sensor 15. Then, the printer 100 is caused to arithmetically operate the correction amounts $\Delta$Ts and $\Delta$Te corresponding to the emitted positions z1 and z2 predicted based on the detection result from the temperature sensor 15. Note that, in the manufacturing process, a relationship between the temperature and the emitted positions z1, z2, and z3 on the scanning line measuring device 1000 is measured in advance, and information thereon is stored in the storage unit 350 of the optical scanning device 11, for example, in the form of a table.

(Measurement of Emitted Position and Scanning Time at Each Image Height Conducted by Scanning Line Measuring Device)

Figure 6B:
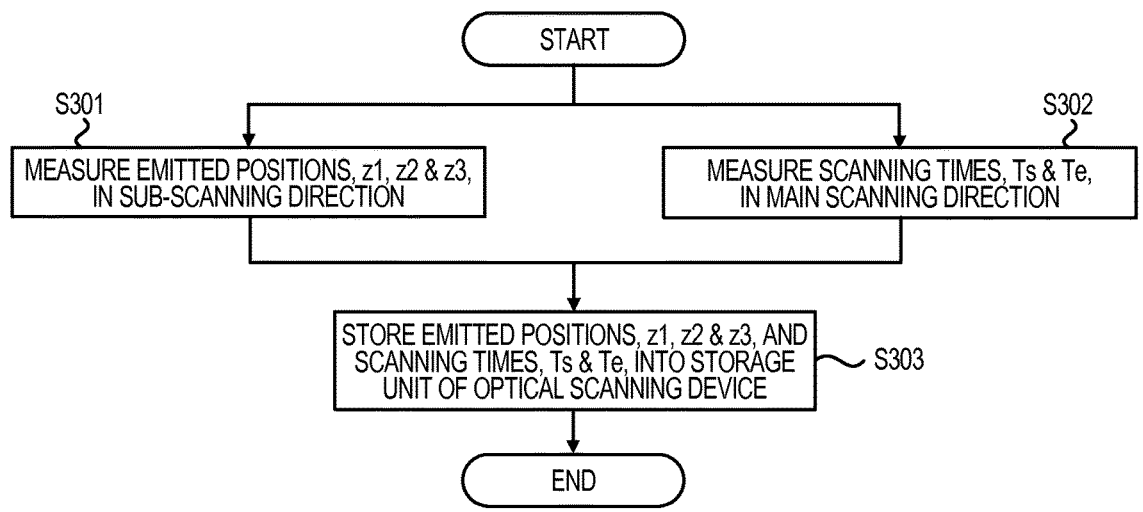
FIG. 6B is a flowchart for illustrating image processing according to a second embodiment of the present invention.

FIG. 6B is a flowchart for illustrating measurement processing for the emitted position and the scanning time at each image height, which is conducted by the scanning line measuring device 1000 according to this embodiment. Note that, the processing of Step S301 and Step S302 is the same as the processing of Step S101 and Step S102 described with reference to FIG. 6A, and descriptions thereof are omitted. In Step S303, the CPU 1050 stores the information on the emitted positions z1, z2, and z3 and the scanning times Ts and Te, which have been measured, into the storage unit 350 of the optical scanning device 11.

(Block Diagram of Printer)

Figure 7:
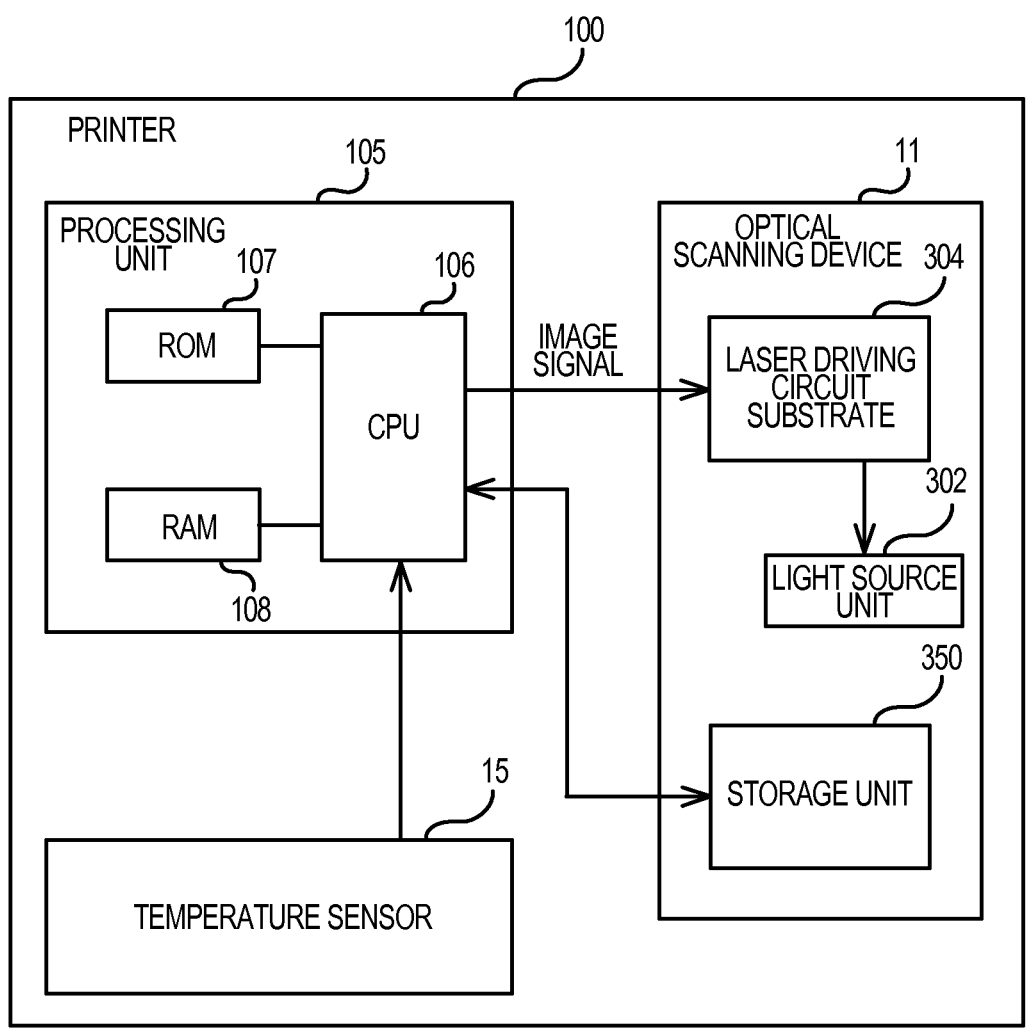
FIG. 7 is a block diagram of an image forming apparatus according to the second embodiment.

FIG. 7 is a block diagram of the printer 100 according to this embodiment. The printer 100 includes the processing unit 105, the optical scanning device 11, and the temperature sensor 15. The processing unit 105 includes the CPU 106, a ROM 107, and a RAM 108, and the CPU 106 executes various kinds of processing by using the RAM 108 as a work area in accordance with various programs stored in the ROM 107. The temperature sensor 15 is arranged in a predetermined position inside the printer 100. The temperature sensor 15 is described later. Note that, the configuration of the optical scanning device 11 is the same as the configuration described with reference to FIG. 2A, FIG. 2B, and FIG. 5, and the same components are denoted by the same reference symbols, descriptions of which are omitted.

The storage unit 350 of the optical scanning device 11 stores the information on the emitted positions z1, z2, and z3 and the scanning times Ts and Te, which are measured by the scanning line measuring device 1000 in Step S301 and Step S302 of FIG. 6B. The CPU 106 subjects the emitted positions z1 and z2 read from the storage unit 350 of the optical scanning device 11 to the correction based on the detection result from the temperature sensor 15, to newly obtain the emitted positions z1 and z2. The CPU 106 calculates the correction amounts $\Delta$Ts and $\Delta$Te from the newly obtained emitted positions z1 and z2, the emitted position z3, and the scanning times Ts and Te, and calculates the actual scanning times Ts' and Te' from the correction amounts $\Delta$Ts and $\Delta$Te. The CPU 106 uses the calculated actual scanning times Ts' and Te' to adjust the frequency of the image clock for generating the image signal to be output to the laser driving circuit substrate 304. The CPU 106 outputs the image data based on the actual scanning times Ts' and Te' to the laser driving circuit substrate 304 of the optical scanning device 11 as the image signal. Then, the laser driving circuit substrate 304 drives the semiconductor laser of the light source unit 302 based on the input image signal. With this configuration, the CPU 106 corrects the one-side magnification difference in consideration of the detection result from the temperature sensor 15 as well.

(Correction of Emitted Position Based on Detection Result from Temperature Sensor)

FIG. 8A is a flowchart of the image processing conducted by the printer 100 in a case of correcting the scanning time in consideration of the result of the detection conducted by the temperature sensor 15. In Step S401, the CPU 106 of the printer 100 reads the information on the emitted positions z1, z2, and z3 and the scanning times Ts and Te stored in the storage unit 350 of the optical scanning device 11 by the scanning line measuring device 1000.

In Step S402, the CPU 106 predicts the values of the new emitted positions z1 and z2 obtained by correcting the emitted positions z1 and z2, which have been read from the storage unit 350 of the optical scanning device 11 in Step S401, by an increase amount of the temperature based on the information on the temperature detected by the temperature sensor 15. In Step S403, the CPU 106 uses Expression (1) to Expression (7) to calculate the correction amounts $\Delta$Ts and $\Delta$Te from the emitted positions z1 and z2 predicted in Step S402, the emitted position z3 read in Step S401, and the scanning times Is and Te. Note that, in this embodiment, the information on the radius R of the photosensitive drum 1, the angles θ1 and θ2 of incidence, and the scanning speed S0 is assumed to be stored in advance in the ROM 107 of the processing unit 105. In Step S404, the CPU 106 calculates the actual scanning times Ts' and Te' from the correction amounts $\Delta$Ts and $\Delta$Te of the scanning time calculated in Step S403, and modulates the image clock based on the scanning times Ts' and Te', to thereby correct the magnification of the image data in the main scanning direction.

As described above, in this embodiment, the same effects as those of the first embodiment are produced, and the one-side magnification difference on a plurality of photosensitive drums is corrected depending on environmental characteristics such as the temperature with high accuracy. This allows suppression of the one-side magnification difference in each scanning line and reduction of the color misregistration in the main scanning direction. Note that, in this embodiment, the temperature sensor 15 is mounted inside the printer 100, but may be mounted in any position as long as there is a correlation between a change amount in the emitted position of the optical scanning device 11 due to the environmental characteristics and the detection result from the temperature sensor 15. Therefore, an installation position of the temperature sensor 15 is not limited thereto, and the temperature sensor 15 may be mounted to, for example, the optical scanning device 11.

As described above, this embodiment allows the magnification error in the main scanning direction to be reduced with an inexpensive configuration while realizing downsizing of an apparatus.

[Third Embodiment]

In a third embodiment of the present invention, there is described a configuration in which the image processing is conducted by the image forming apparatus through use of the actual scanning times Ts' and Te' stored in the optical scanning device 11. The same components as those of the first embodiment are denoted by the same reference symbols, and descriptions thereof are omitted. Further, a block diagram of the scanning line measuring device 1000 according to this embodiment and processing to be executed by the scanning line measuring device 1000 are the same as those described in the first embodiment with reference to FIG. 5, FIG. 6A, and FIG. 6B, and descriptions thereof are omitted.

(Correction Processing)

FIG. 8B is a flowchart for illustrating correction processing for the one-side magnification difference based on the actual scanning times Ts' and Te', which is executed by the CPU 106 of the printer 100. In Step S201, the CPU 106 reads the actual scanning times Ts' and Te' stored in the storage unit 350 of the optical scanning device 11 by the scanning line measuring device 1000 in FIG. 6A. In Step S202, the CPU 106 modulates the image clock based on the actual scanning times Ts' and Te' read in Step S201, and causes the laser driving circuit substrate 304 to drive the semiconductor laser of the light source unit 302.

As described above, this embodiment can provide the optical scanning device 11 configured to store the information obtained by correcting the one-side magnification difference on the photosensitive drum with high accuracy in addition to the same effects as those of the first embodiment and the second embodiment. In other words, high cost is not required to provide an image processing unit inside the printer 100, or there is no need to conduct complicated correction processing. Further, the optical scanning device 11 already stores the correction information (Ts' and Te'), which allows an improvement in serviceability such as replacement in case of failure. Accordingly, the optical scanning device having high quality is allowed to be provided with the inexpensive configuration.

Note that, the number of components described in the first embodiment to the third embodiment, positions of the components, and the like are not intended to limit the scope of the present invention unless otherwise specified. For example, the scanning time is corrected through use of data on two segments (segment from the −100-mm image height to the 0-mm image height and segment from the 0-mm image height to the +100-mm image height) of the optical scanning device, but the number of segments for the correction is not limited to two, and the scanning time may also be corrected for a plurality of segments more than the two segments. Further, the number of positions for the measurement of the optical scanning device 11 is not limited to three as long as there are a plurality of points for the measurement, and a resolving power of the correction improves as the number of points for the measurement increases, which allows the one-side magnification difference to be corrected with high accuracy.

As described above, this embodiment allows the magnification error in the main scanning direction to be reduced with an inexpensive configuration while realizing downsizing of an apparatus.

[Fourth Embodiment]

The same components as those of the first embodiment are denoted by the same reference symbols, and descriptions thereof are omitted.

(Measurement of Emitted Position Conducted by Scanning Line Measuring Device)

Figure 11A:
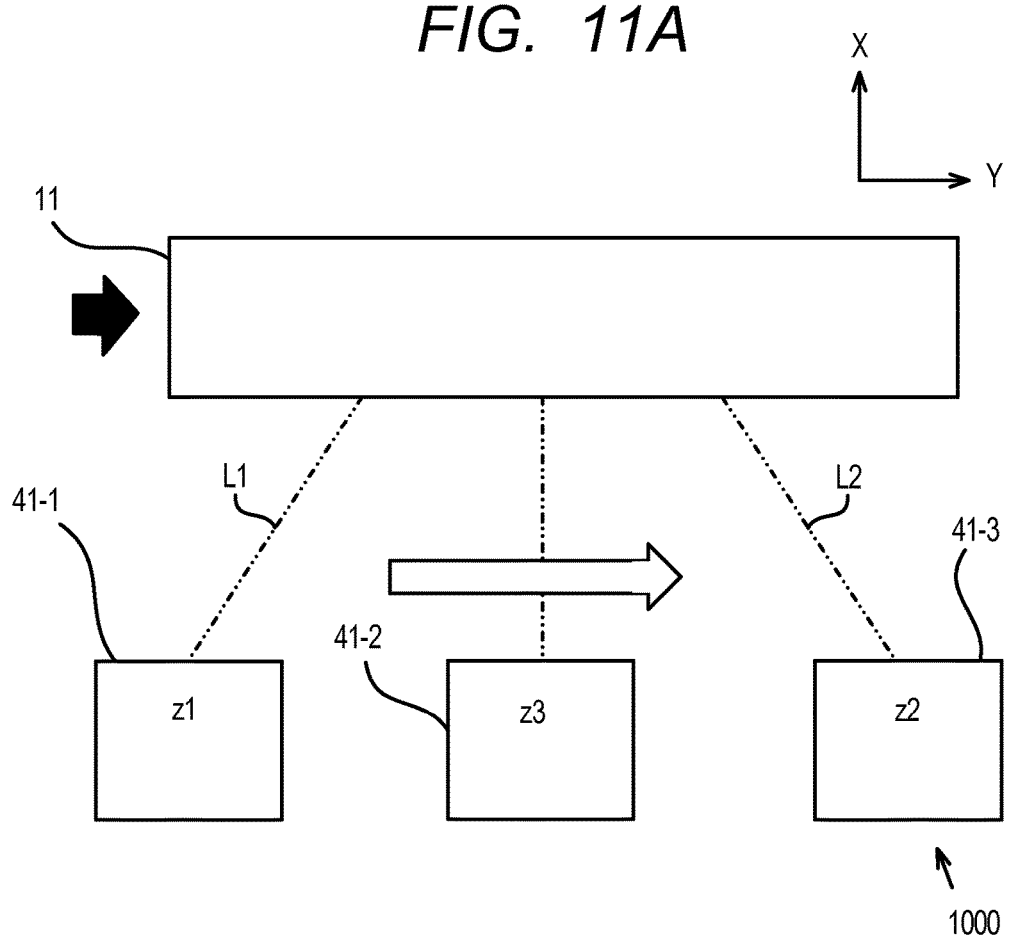
FIGS. 11A and 11B are diagrams for illustrating positional relationships in the main scanning direction and in a sub-scanning direction between the optical scanning device and the scanning line measuring device.
Figure 11B:
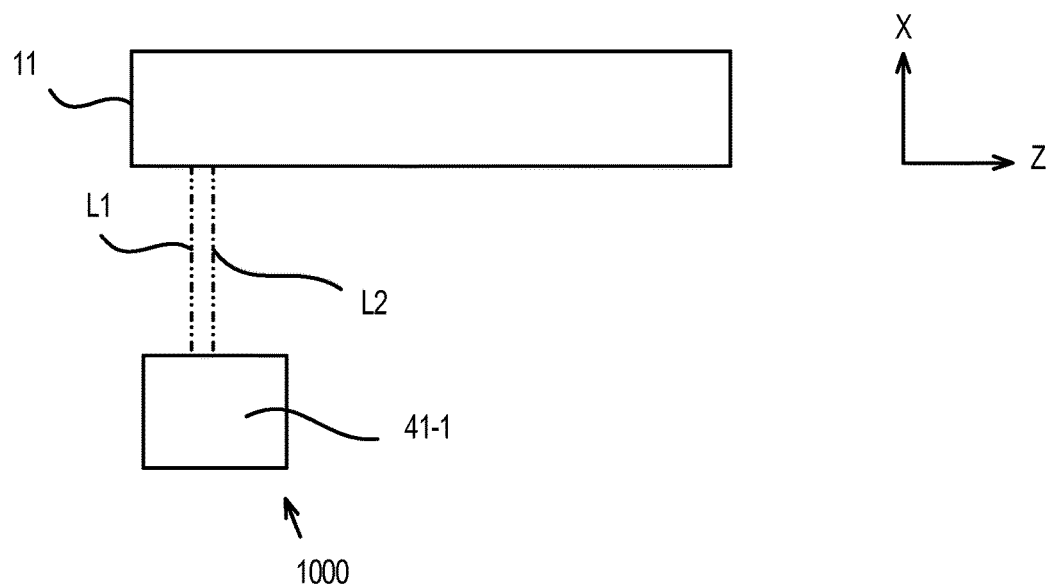

In FIGS. 11A and 11B, a positional relationship between the scanning line measuring device 1000 described later with reference to FIG. 13 and the optical scanning device 11 is illustrated. In the scanning line measuring device 1000, the sensors 41-1, 41-2, and 41-3 for measurement configured to measure the scanning line position of the optical scanning device 11 are arranged. FIG. 11A is a diagram for illustrating the main scanning direction of the optical scanning device 11, and FIG. 11B is a diagram for illustrating the sub-scanning direction, which is viewed from the arrow direction in FIG. 11A. The sensors 41-1, 41-2, and 41-3 for measurement are arranged at the positions spaced apart from the optical scanning device 11 by a predetermined distance so as to establish the actual positional relationship between the optical scanning device 11 and the photosensitive drum 1 of the printer 100 to which the optical scanning device 11 is mounted. Further, the sensor 41-2 for measurement is arranged at the position corresponding to the center of the image formed on the actual photosensitive drum 1 in the main scanning direction (hereinafter referred to as "image center"). Note that, the image center is referred to also as "0-mm image height". In this case, the image height represents the position in the main scanning direction obtained when the optical scanning device 11 and the photosensitive drum 1 are arranged at the positions spaced apart from each other by the above-mentioned predetermined distance, and is expressed as 0 mm at the image center, a minus value on the upstream side in the main scanning direction, and a plus value on the downstream side in the main scanning direction.

Further, the sensor 41-1 for measurement is arranged at the position corresponding to the vicinity of the end portion of the image formed on the actual photosensitive drum 1 on the upstream side in the main scanning direction. Note that, the position where the sensor 41-1 for measurement is arranged is referred to also as "−100-mm image height". In addition, the sensor 41-3 for measurement is arranged at the position corresponding to the vicinity of the end portion of the image formed on the actual photosensitive drum 1 on the downstream side in the main scanning direction. Note that, the position where the sensor 41-3 for measurement is arranged is referred to also as "+100-mm image height". In this embodiment, the image heights at which the sensors 41-1 and 41-3 for measurement are arranged are set to ±100 mm. However, those values are determined depending on the length in the main scanning direction of the sheet S, which is usable for the printer 100 to which the optical scanning device 11 is mounted, and are not limited to ±100 mm.

In this manner, for the measurement of the scanning line to be conducted by the scanning line measuring device 1000 according to this embodiment, the sensors 41-1, 41-2, and 41-3 for measurement configured to measure the emitted position of the scanning line in the sub-scanning direction are provided at the three positions in the main scanning direction. The sensors 41-1, 41-2, and 41-3 for measurement are, for example, the line sensors, each of which is arranged such that the longitudinal direction in which the light receiving elements of the line sensor are aligned is perpendicular to the main scanning direction and parallel with the sub-scanning direction. This allows the emitted position in the sub-scanning direction at each of the image heights to be detected by detecting which of the light receiving elements of the line sensor the laser light has been emitted onto. The sensors 41-1, 41-2, and 41-3 for measurement are hereinafter referred to as "line sensors 41-1, 41-2, and 41-3". The line sensors 41-1, 41-2, and 41-3 are provided so as to correspond to each of the laser lights Ly, Lm, Lc, and Lk, but the same processing is conducted for each of the laser lights, and the following description is directed to one laser light. The laser light emitted from the optical scanning device 11 is subjected to the scanning from the −100-mm image height side to the +100-mm image height side.

In the measurement of the emitted position in the sub-scanning direction conducted by the scanning line measuring device 1000, the emitted position z1 at the −100-mm image height is measured by the line sensor 41-1. Further, the emitted position z3 at the 0-mm image height is measured by the line sensor 41-2, and the emitted position z2 at the +100-mm image height is measured by the line sensor 41-3. In this embodiment, in the manufacturing process, the emitted positions z1, z2, and z3 measured by the scanning line measuring device 1000 are used to calculate the tilt and the bow of the scanning line, and the light emission timing is controlled based on the processing for the image data, to thereby correct the distortion of the image.

The planar line sensors 41-1, 41-2, and 41-3 are provided as the sensors for measurement on the scanning line measuring device 1000 illustrated in FIG. 11A, and the emitted positions z1, z2, and z3 that are measured are values measured on a plane. Therefore, when there is a difference between the emitted position z1 at the −100-mm image height and the emitted position z2 at the +100-mm image height on the scanned surface as in a case of the light flux L1 and the light flux L2 illustrated in FIG. 11B, the tilt of the scanning line is expressed as a straight line connecting z1 and z2. However, as illustrated in FIG. 2B, the laser light emitted from the optical scanning device 11 scans the surface of the photosensitive drum 1 at the time of the image formation, and hence the scanned surface is a curved surface. Therefore, the tilt of the straight line connecting the emitted position z1' and the emitted position z2' on the photosensitive drum 1 differs from the tilt of the straight line connecting the emitted position z1 and the emitted position z2 on the scanning line measuring device 1000. Further, when the emitted position z3 at the 0-mm image height on the scanning line measuring device 1000 does not exist on a line connecting the emitted position z1 and the emitted position z2, a bow occurs in the scanning line. A degree of bowing of the scanning line in which the bow has occurred also differs between on the scanning line measuring device 1000 and on the photosensitive drum 1.

(Influence of Tilt and Bow of Scanning Line on Emitted Position)

Figure 12A:
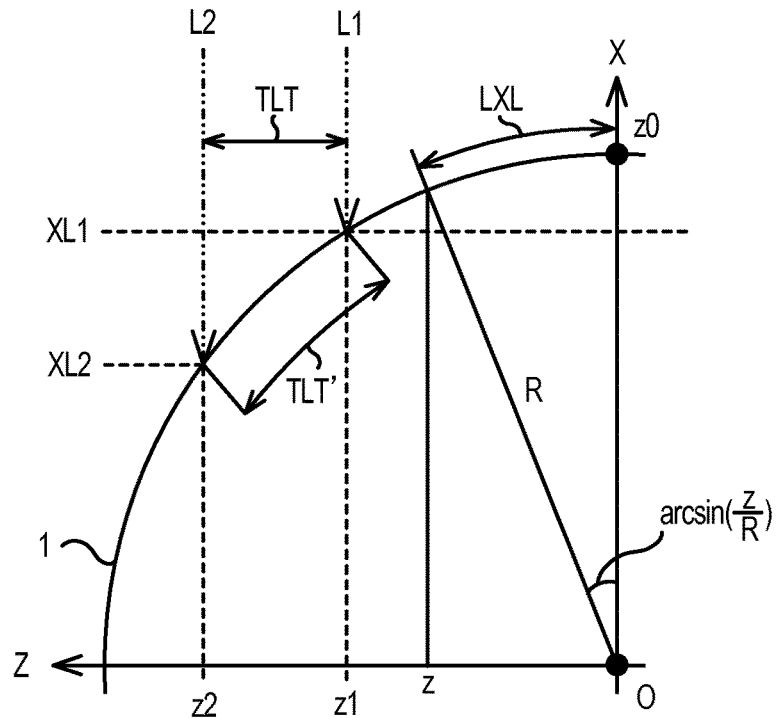
FIGS. 12A and 12B are diagrams for illustrating relationships between the emitted position and the photosensitive drum that are exhibited when the scanning line causes a tilt and when the scanning line causes a bow.
Figure 12B:
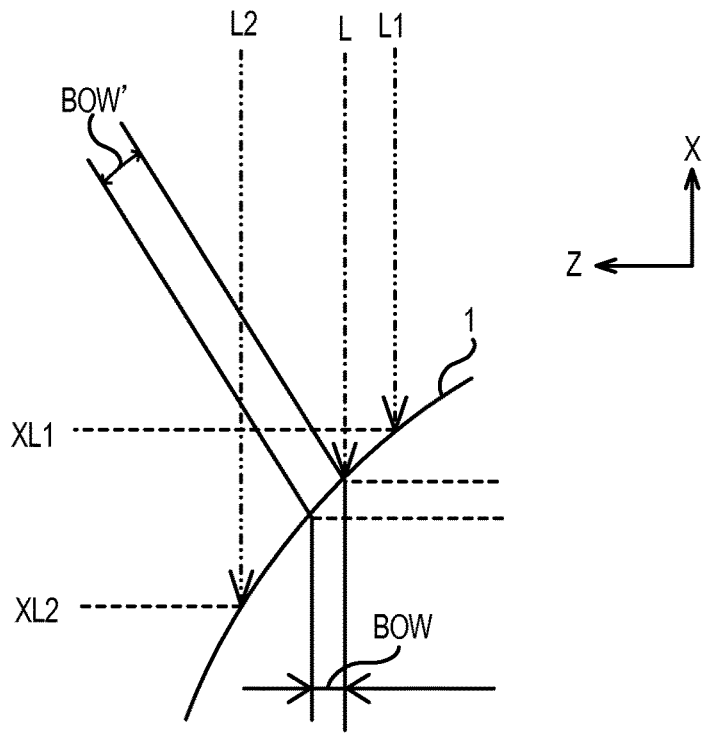

In FIG. 12A and FIG. 12B, influences of a case where the scanning line exhibits a tilt and a case where the scanning line exhibits a bow, which are exerted on the emitted position on the photosensitive drum 1, are illustrated. The case where the scanning line exhibits a tilt is illustrated in FIG. 12A, and the case where the scanning line exhibits a bow is illustrated in FIG. 12B. In this case, it is assumed that the radius of the photosensitive drum 1 is R, and the emitted position on the photosensitive drum 1 in the sub-scanning direction is z. Note that, it is assumed that the radius of the photosensitive drum 1y is Ry, the radius of the photosensitive drum 1m is Rm, the radius of the photosensitive drum 1c is Rc, and the radius of the photosensitive drum 1k is Rk. In this case, at a point z0, a straight line (X-axis) that passes through the center O of the photosensitive drum 1 illustrated in FIG. 9A and is parallel with the laser light emitted onto the surface of the photosensitive drum 1 intersects with the surface of the photosensitive drum 1. A distance LXL from z0 to a predetermined emitted position z on the photosensitive drum along the surface of the photosensitive drum 1 is expressed as follows by Expression (10).

$$LXL = R \times \arcsin(z/R) \quad (10)$$

<Case where Scanning Line Exhibits Tilt>

First, the case where the scanning line exhibits a tilt is described. On the planar line sensors 41-1 and 41-3, a tilt amount TLT of the scanning line on the scanning line measuring device 1000 is expressed as the following expression. In this case, the tilt amount TLT is caused by the emitted position z1 at the −100-mm image height on the scanning line measuring device 1000 and the emitted position z2 at the +100-mm image height on the scanning line measuring device 1000.

$$TLT = z1 - z2 \quad (11)$$

On the other hand, a distance along the surface of the photosensitive drum 1 from z0 to the emitted position z1 on the photosensitive drum 1 is set to LXL1, and a distance along the surface of the photosensitive drum 1 from z0 to the emitted position z2 on the photosensitive drum 1 is set to LXL2. Then, a tilt amount TLT' caused on the surface of the photosensitive drum 1 by the emitted position z1 at the −100-mm image height on the scanning line measuring device 1000 and the emitted position z2 at the +100-mm image height on the scanning line measuring device is expressed as follows by Expression (12) based on Expression (10).

$$\begin{aligned} TLT' &= LXL1 - LXL2 \\ &= R \times (\arcsin(z1/R) - \arcsin(z2/R)) \end{aligned} \quad (12)$$

In this case, an error between the tilt amount TLT on the scanning line measuring device 1000 and the tilt amount TLT' on the photosensitive drum 1, which has occurred because the shape of the photosensitive drum 1 is a shape having a curved surface, is set as ΔTLT. Then, the error ΔTLT to be corrected regarding a tilt amount of the scanning line is expressed as follows by Expression (13) based on Expression (11) and Expression (12).

$$\begin{aligned} \Delta TLT &= TLT' - TLT \\ &= R \times (\arcsin(z1/R) - \arcsin(z2/R)) - (z1 - z2) \end{aligned} \quad (13)$$

The emitted position z1' at the −100-mm image height and the emitted position z2' at the +100-mm image height on the surface of the photosensitive drum 1 are expressed as follows by Expression (14) and Expression (15) based on Expression (13).

$$z1'=z1+\Delta TLT/2 \quad (14)$$

$$z2'=z2-\Delta TLT/2 \quad (15)$$

In this manner, when the scanning line exhibits a tilt, the emitted positions z1' and z2' at the respective image heights on the surface of the photosensitive drum 1 can be obtained based on the emitted positions z1 and z2 at the respective image heights measured by the scanning line measuring device and the radius R of the photosensitive drum 1. Note that, in this embodiment, the radius R of the circular arc surface being the surface of the photosensitive drum 1 is used as the information on the shape of the photosensitive drum 1 provided as the image bearing member, but another physical quantity such as a curvature may be used as the information on the shape of the image bearing member.

<Case where Scanning Line Exhibits Bow>

Next, the case where the scanning line exhibits a bow is described. On the planar line sensors 41-1, 41-2, and 41-3, a bow amount BOW, which is caused by the emitted position z1 at the −100-mm image height, the emitted position z2 at the +100-mm image height, and the emitted position z3 at the 0-mm image height on the scanning line measuring device 1000, is expressed as follows by Expression (16).

$$BOW=(z1+z2)/2-z3 \quad (16)$$

On the other hand, a bow amount BOW' of the scanning line caused on the surface of the photosensitive drum 1 by the emitted position z1 at the −100-mm image height, the emitted position z2 at the +100-mm image height, and the emitted position z3 at the 0-mm image height on the scanning line measuring device 1000 is expressed as follows by Expression (17) based on Expression (10).

$$\begin{aligned}BOW' &= (LXL1 + LXL2)/2 - LXL3 \\ &= R \times ((\arcsin(z1/R) + \arcsin(z2/R))/2 - \arcsin(z3/R))\end{aligned} \quad (17)$$

In this case, an error between the bow amount BOW on the scanning line measuring device 1000 and the bow amount BOW' on the photosensitive drum 1, which has occurred because the shape of the photosensitive drum 1 is the shape having a curved surface, is set as ΔBOW. Then, the error ΔBOW to be corrected regarding a bow amount of the scanning line is expressed as follows by Expression (18) based on Expression (16) and Expression (17).

$$\begin{aligned}\Delta BOW &= BOW' - BOW \\ &= R \times ((\arcsin(z1/R) + \arcsin(z2/R))/2 - \arcsin(z3/R)) - \\ & \quad ((z1+z2)/2 - z3)\end{aligned} \quad (18)$$

The emitted position z3' at the 0-mm image height on the surface of the photosensitive drum 1 is expressed as follows by Expression (19) based on Expression (18).

$$z3'=z3+\Delta BOW \quad (19)$$

In this manner, when the scanning line exhibits a bow, the emitted positions z1', z2', and z3' at the respective image heights on the surface of the photosensitive drum 1 can be obtained and set based on the emitted positions z1, z2, and z3 at the respective image heights measured by the scanning line measuring device 1000 and the radius R of the photosensitive drum 1.

Then, in order to correct the emitted position in the sub-scanning direction, the emitted positions z1', z2', and z3' on the photosensitive drum 1 are used instead of the emitted positions z1, z2, and z3 on the scanning line measuring device 1000. This allows the deviation to be corrected, in this embodiment, in consideration of the shape of the photosensitive drum 1 with high accuracy.

(Block Diagram of Scanning Line Measuring Device)

Figure 13:
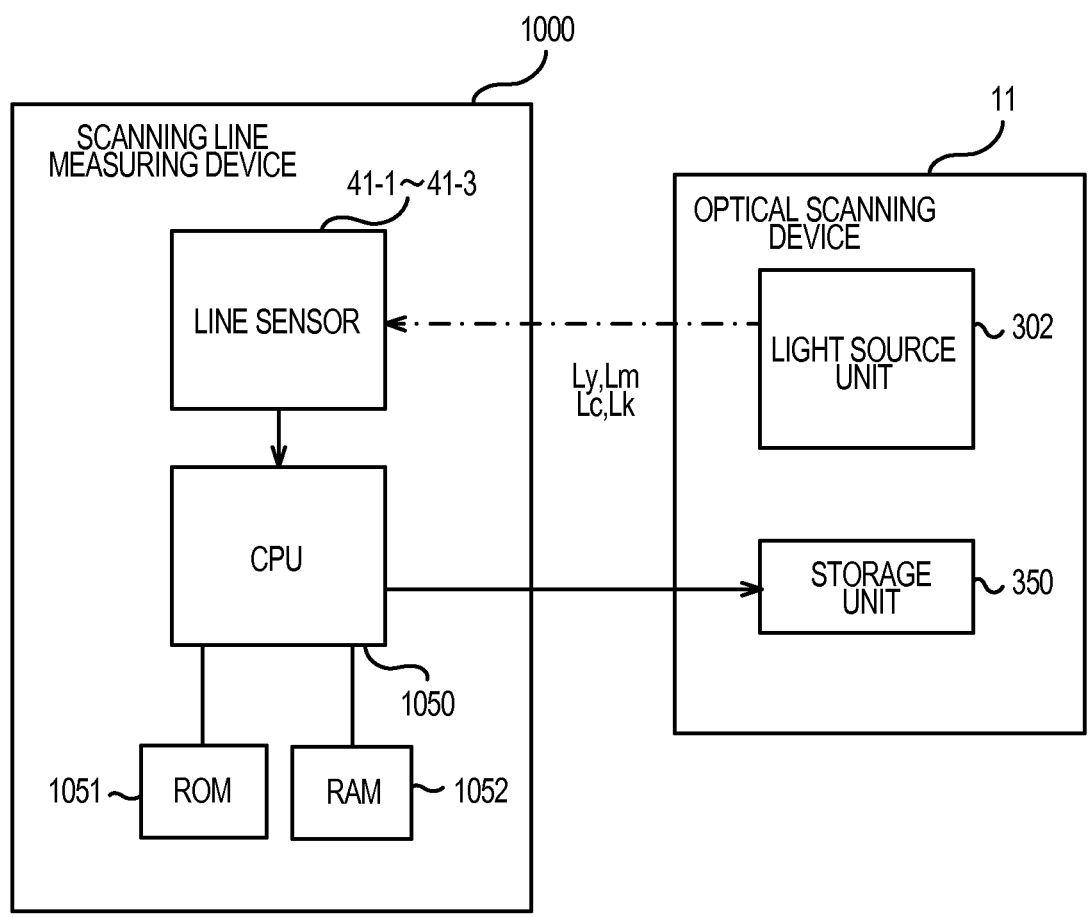
FIG. 13 is a block diagram of a scanning line measuring device and an optical scanning device according to a fourth embodiment of the present invention.

FIG. 13 is a block diagram of the scanning line measuring device 1000. The scanning line measuring device 1000 includes the line sensors 41-1, 41-2, and 41-3, the CPU 1050, the ROM 1051, and the RAM 1052, which are described above. The CPU 1050 executes various kinds of processing by using the RAM 1052 as a work area in accordance with various programs stored in the ROM 1051. The CPU 1050 causes the line sensors 41-1, 41-2, and 41-3 to measure the emitted positions z1, z2, and z3 of the laser light emitted from the optical scanning device 11. Note that, the CPU 1050 measures the emitted positions z1, z2, and z3 on the scanning line measuring device 1000 for each of the colors (four colors in this embodiment).

The CPU 1050 stores the information on the measured emitted positions z1, z2, and z3 into the storage unit 350 provided as the storage unit included in the optical scanning device 11. Note that, the CPU 1050 of the scanning line measuring device 1000 may be configured as follows when the radius R of the photosensitive drum 1 of the printer 100 to which the optical scanning device 11 to be measured is mounted is known and when the information on the radius R of the photosensitive drum 1 is stored in advance in the ROM 1051. Specifically, the CPU 1050 may obtain the error ΔTLT of the tilt amount and the error ΔBOW of the bow amount from the emitted positions z1, z2, and z3 on the scanning line measuring device 1000, and may store information thereon in the storage unit 350. In addition, the CPU 1050 may obtain the emitted positions z1', z2', and z3' on the photosensitive drum 1, and may store information thereon in the storage unit 350. Note that, as the radius R of the photosensitive drum 1 stored in the ROM 1051, the information corresponding to the number of colors (for example, four colors) to be subjected to the scanning by the optical scanning device 11 is assumed to be stored.

(Measurement of Emitted Position at Each Image Height Conducted by Scanning Line Measuring Device)

Figure 14:
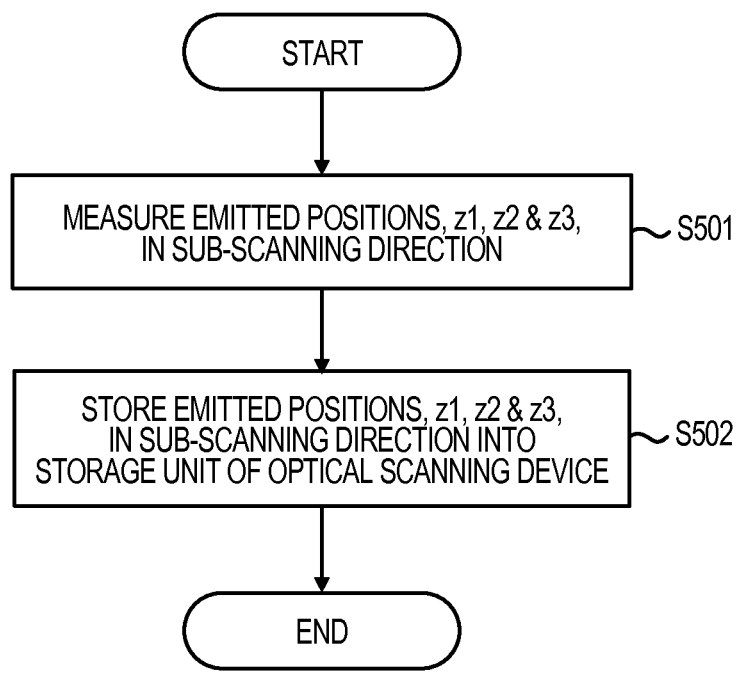
FIG. 14 is a flowchart for illustrating measurement processing for an emitted position of a scanning line according to the fourth embodiment.

FIG. 14 is a flowchart for illustrating processing executed by the CPU 1050 of the scanning line measuring device 1000 in the manufacturing process. When the optical scanning device 11 is placed above the scanning line measuring device 1000 as a measurement target, the measurement of the emitted position of the laser light on the scanning line measuring device 1000 is started. Note that, the measurement conducted for one color is illustrated in FIG. 14, and the measurement is assumed to be conducted the number of times corresponding to the four colors in actuality. In Step S501, the CPU 1050 causes the line sensors 41-1, 41-2, and 41-3 to measure the emitted positions z1, z2, and z3 of the laser light emitted from the optical scanning device 11 at the respective image heights in the sub-scanning direction. In Step S502, the CPU 1050 stores the information on the emitted positions z1, z2, and z3 on the scanning line measuring device 1000, which is measured in Step S501, into the storage unit 350 of the optical scanning device 11, to bring the processing to an end.

As described above, this embodiment allows the color misregistration to be reduced with an inexpensive configuration while realizing downsizing of an apparatus.

[Fifth Embodiment]

In a fifth embodiment of the present invention, there is described a case where the optical scanning device 11 having the information on the emitted positions z1, z2, and z3 stored in the storage unit 350 by the scanning line measuring device 1000 described in the fourth embodiment is mounted to the printer 100.

(Block Diagram of Printer)

Figure 15B:
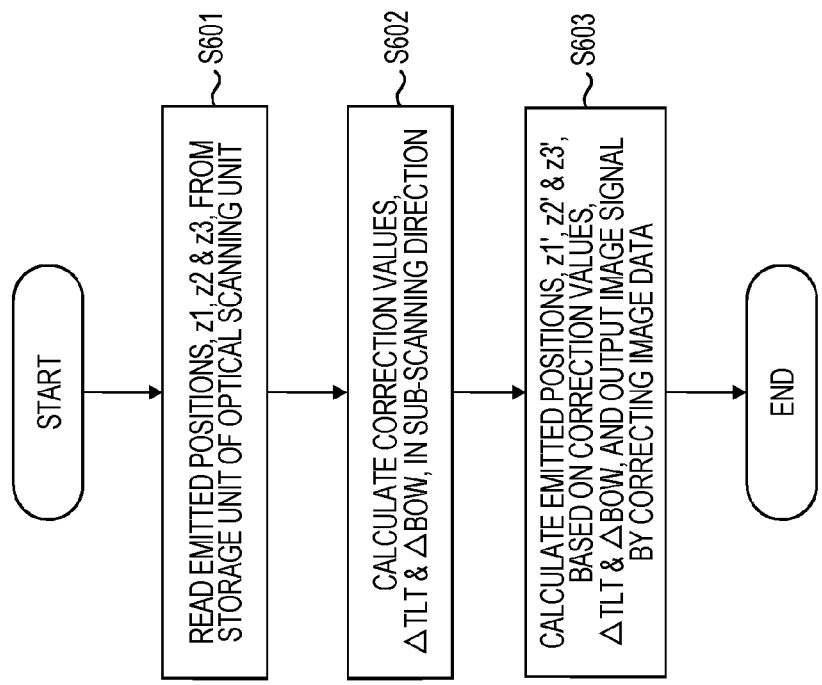
FIG. 15B is a flowchart for illustrating correction processing for a deviation in the sub-scanning direction.
Figure 15A:
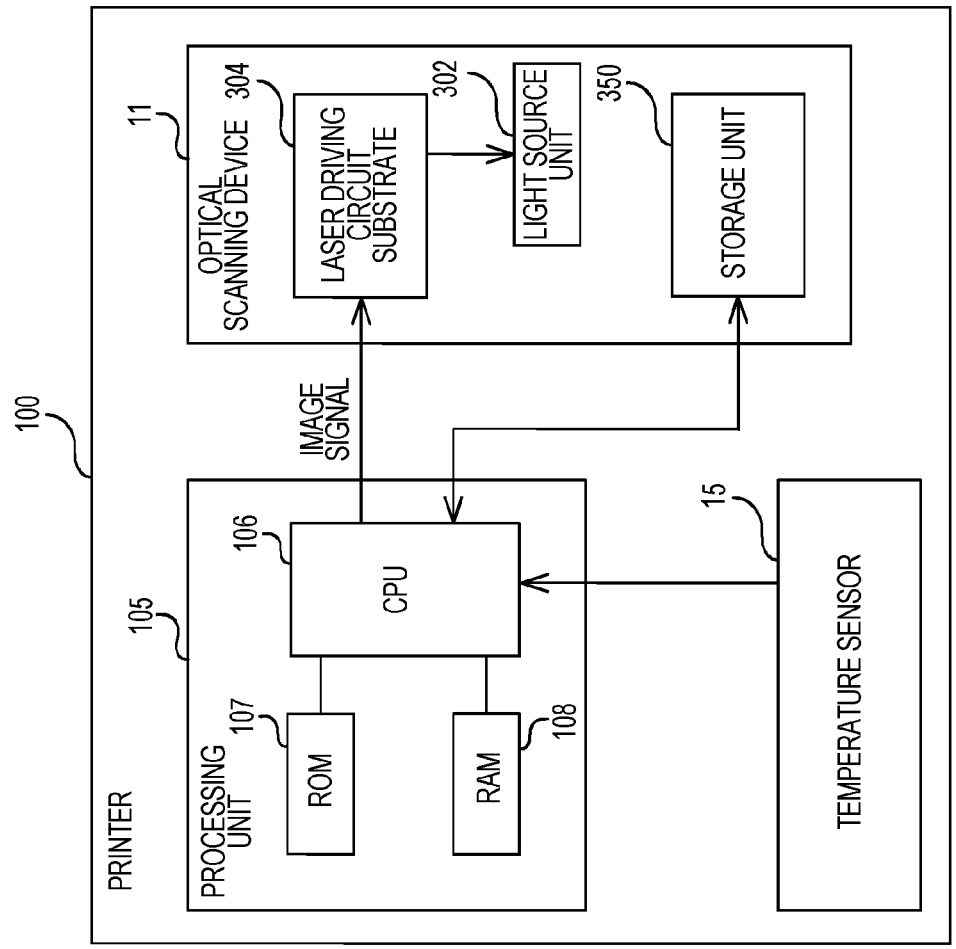
FIG. 15A is a block diagram of an image forming apparatus according to a fifth embodiment of the present invention.

FIG. 15A is a block diagram of the printer 100 according to this embodiment. The printer 100 includes the processing unit 105, the optical scanning device 11, and the temperature sensor 15. The processing unit 105 includes the CPU 106, the ROM 107, and the RAM 108, and the CPU 106 executes various kinds of processing by using the RAM 108 as a work area in accordance with various programs stored in the ROM 107. The temperature sensor 15 is arranged in a predetermined position inside the printer 100. The temperature sensor 15 is described later. Note that, the configuration of the optical scanning device 11 is the same as the configuration described with reference to FIG. 2A, FIG. 2B, and FIG. 13, and the same components are denoted by the same reference symbols, descriptions of which are omitted.

The information on the emitted position z1 at the −100-mm image height, the emitted position z2 at the +100-mm image height, and the emitted position z3 at the 0-mm image height, which are measured by the scanning line measuring device 1000 described in the fourth embodiment, is stored in the storage unit 350 of the optical scanning device 11. Further, the information on the radius R of the photosensitive drum 1 corresponding to the respective colors is stored in the ROM 107 of the printer 100 provided as a storage medium. Note that, a generally-used semiconductor memory is employed as the storage medium, but the printer 100 may include, for example, a hard disk drive configured to store the above-mentioned information.

The CPU 106 uses the emitted positions z1, z2, and z3 on the scanning line measuring device 1000 read from the storage unit 350 of the optical scanning device 11 and the radius R of the photosensitive drum 1 read from the ROM 107, to calculate the respective errors (hereinafter referred to also as "correction amounts") ΔTLT and ΔBOW. In this case, the CPU 106 calculates ΔTLT by Expression (13) described in the fourth embodiment, and calculates ΔBOW by Expression (18). Then, the CPU 106 calculates the emitted positions z1', z2', and z3' on the photosensitive drum 1 by Expression (14), Expression (15), and Expression (19) described in the fourth embodiment. Then, the CPU 106 conducts the correction by subjecting the input image data to the image processing in the sub-scanning direction of the scanning line based on the calculated emitted positions z1', z2', and z3'.

The CPU 106 outputs the image data, which has been subjected to the correction of the tilt and the bow of the scanning line, to the laser driving circuit substrate 304 of the optical scanning device 11 as the image signal. Then, the laser driving circuit substrate 304 drives the semiconductor laser of the light source unit 302 based on the input image signal subjected to the correction. In this manner, in order to correct the emitted position of the laser light in the sub-scanning direction, the emitted positions z1', z2', and z3' on the photosensitive drum 1 are used instead of the emitted positions z1, z2, and z3 on the scanning line measuring device 1000. This allows image correction to be conducted with high accuracy.

(Correction Processing)

FIG. 15B is a flowchart for illustrating processing for correcting the tilt and the bow of the scanning line of the optical scanning device 11, which is executed by the CPU 106 of the printer 100 according to this embodiment. In Step S601, the CPU 106 reads the information on the emitted positions z1, z2, and z3 on the scanning line measuring device 1000 from the storage unit 350 of the optical scanning device 11. Further, the CPU 106 reads the information on the radius R of the photosensitive drum 1 from the ROM 107. In Step S602, the CPU 106 uses the emitted positions z1, z2, and z3 on the scanning line measuring device 1000 read in Step S601 and the radius R of the photosensitive drum 1, to calculate the correction value ΔTLT of the laser light in the sub-scanning direction by Expression (13) described in the fourth embodiment. Further, the CPU 106 uses the emitted positions z1, z2, and z3 on the scanning line measuring device 1000 read in Step S601 and the radius R of the photosensitive drum 1, to calculate the correction value ΔBOW by Expression (18) described in the fourth embodiment.

In Step S603, the CPU 106 calculates the emitted positions z1', z2', and z3' on the photosensitive drum 1, which have been subjected to the correction of the tilt and the bow of the scanning line, based on the correction values ΔTLT and ΔBOW calculated in Step S602. Then, the CPU 106 uses the emitted positions z1', z2', and z3' on the photosensitive drum 1 to correct the image data, and outputs the corrected image data to the optical scanning device 11 as the image signal.

(Regarding Other Corrections)

In regard to the printer 100, the execution of the image forming operation causes an increase in the temperature inside the printer 100 due to the operation of each unit included in the printer 100. The increase in the temperature inside the printer 100 influences the optical scanning device 11, to cause a change in the emitted position of the laser light. Therefore, there may be provided a configuration in which, in the manufacturing process, the relationship between the temperature and the emitted positions z1, z2, and z3 on the scanning line measuring device 1000 is measured in advance, and information thereon is stored in the storage unit 350 of the optical scanning device 11, for example, in the form of a table.

In this case, the CPU 106 uses the temperature sensor 15 provided inside the printer 100 to detect the temperature inside the printer 100. Then, the CPU 106 reads the emitted positions z1, z2, and z3 corresponding to the temperature inside the printer 100 detected by the temperature sensor 15, from the storage unit 350. In this case, the CPU 106 reads the emitted positions z1, z2, and z3 corresponding to the detected temperature based on the information on association between the temperature and the emitted positions z1, z2, and z3, which is stored in the storage unit 350 of the optical scanning device 11. The processing conducted by the CPU 106 is regarded also as processing for correcting the emitted positions z1, z2, and z3 on the scanning line measuring device 1000 based on the temperature detected by the temperature sensor 15. In this manner, the CPU 106 may be configured to correct the values of the emitted positions z1, z2, and z3 on the scanning line measuring device 1000 based on the detection result from the temperature sensor 15, and to calculate the correction amounts ΔTLT and ΔBOW based on the emitted positions z1, z2, and z3 that have been corrected based on the temperature. Such a configuration allows the reduction of the color misregistration due to the increase in the temperature inside the printer 100. Note that, the temperature sensor 15 is arranged in such a position that the correlation between the temperature detected by the temperature sensor 15 and the emitted position of the laser light emitted from the semiconductor laser of the light source unit 302 is obtained, for example, in a vicinity of the optical scanning device 11.

As described above, this embodiment allows the color misregistration to be reduced with an inexpensive configuration while realizing downsizing of an apparatus.

[Sixth Embodiment]

In a sixth embodiment of the present invention, there is described a configuration in which the CPU 1050 of the scanning line measuring device 1000 obtains the emitted positions z1', z2', and z3' on the photosensitive drum 1, and causes the storage unit 350 of the optical scanning device 11 to store the emitted positions z1', z2', and z3'. Note that, the configuration of the optical scanning device 11 is the same as that described with reference to FIGS. 2A and 2B, and the same components are denoted by the same reference symbols, descriptions of which are omitted. Further, this embodiment differs from the fourth embodiment or the fifth embodiment in the information stored in the storage unit 350 of the optical scanning device 11, and the block diagrams of FIG. 13 and FIG. 15A are applied to the other components.

(Measurement of Emitted Position at Each Image Height Conducted by Scanning Line Measuring Device)

In this embodiment, in Step S502 of FIG. 14, the CPU 1050 of the scanning line measuring device 1000 uses the emitted positions z1, z2, and z3 measured by the line sensors 41-1, 41-2, and 41-3, to calculate the correction values ΔTLT and ΔBOW. The CPU 1050 calculates the emitted positions z1', z2', and z3' on the photosensitive drum 1, which have been corrected, from the calculated correction values ΔTLT and ΔBOW. Note that, the information on the radius R of the photosensitive drum 1 of the printer 100 to which the optical scanning device 11 is mounted is assumed to be stored in advance in the ROM 1051. Then, the CPU 1050 stores the information on the calculated emitted positions z1', z2', and z3' on the photosensitive drum 1 into the storage unit 350 of the optical scanning device 11.

(Correction Processing)

Figure 16:
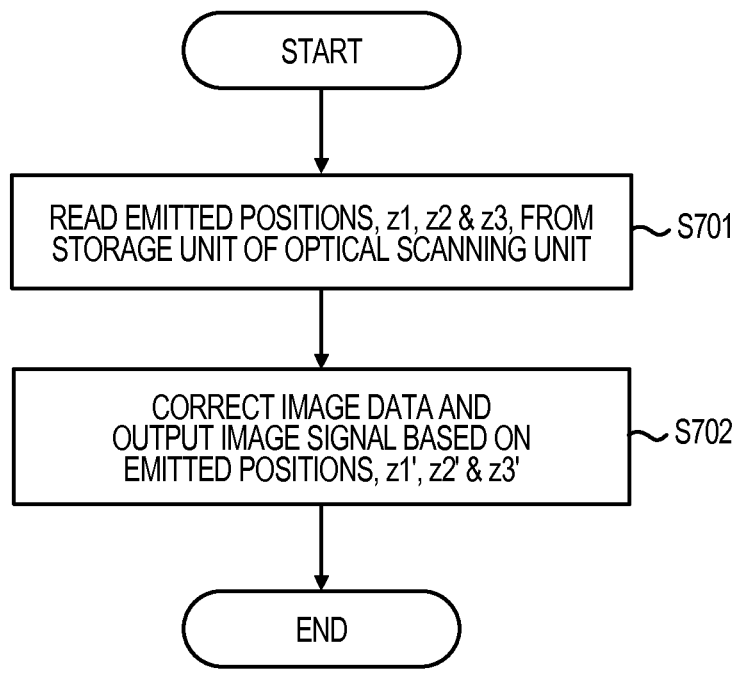
FIG. 16 is a flowchart for illustrating correction processing for a deviation in the sub-scanning direction according to a sixth embodiment of the present invention.

FIG. 16 is a flowchart for illustrating processing for correcting the tilt and the bow of the scanning line of the optical scanning device 11, which is executed by the CPU 106 of the printer 100 according to this embodiment. In Step S701, the CPU 106 reads the emitted positions z1', z2', and z3' on the photosensitive drum 1 calculated by the CPU 1050 of the scanning line measuring device 1000 from the storage unit 350 of the optical scanning device 11. In this case, the emitted positions z1', z2', and z3' on the photosensitive drum 1 are the values calculated in advance by the CPU 1050 of the scanning line measuring device 1000 based on the correction amounts ΔTLT and ΔBOW. Further, the correction amounts ΔTLT and ΔBOW are the values calculated by using the emitted position z1 at the −100-mm image height, the emitted position z2 at the +100-mm image height, and the emitted position z3 at the 0-mm image height measured by the scanning line measuring device 1000 through use of the line sensors 41-1, 41-2, and 41-3 and the radius R of the photosensitive drum 1.

In Step S702, the CPU 106 corrects the image data by subjecting the image data to processing (image processing) in the sub-scanning direction of the scanning line based on the emitted positions z1', z2', and z3' on the photosensitive drum 1 read from the storage unit 350 of the optical scanning device 11 in Step S701. The CPU 106 outputs the corrected image data to the laser driving circuit substrate 304 of the optical scanning device 11 as the image signal.

In this manner, this embodiment is configured to store the emitted positions z1', z2', and z3' on the photosensitive drum 1 in advance in the storage unit 350 of the optical scanning device 11. This configuration allows the correction in the sub-scanning direction to be conducted with high accuracy even when the optical scanning device 11 needs to be replaced. Note that, in the above-mentioned embodiment, the number of points for the measurement of the emitted position on the scanning line measuring device 1000 in the main scanning direction is three, but the number of points for the measurement is not limited to three, and the use of more points for the measurement allows the correction to be conducted with higher accuracy.

As described above, this embodiment allows the color misregistration to be reduced with an inexpensive configuration while realizing downsizing of an apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-250333, filed Dec. 10, 2014 and No. 2014-250334, filed Dec. 10, 2014, which are hereby incorporated by reference herein in their entirety.

What is claimed is:

1. An optical scanning device, comprising:
   a light source configured to emit laser light;
   a deflection unit configured to deflect the laser light emitted from the light source, and move a spot of the laser light emitted onto a scanned surface in a main scanning direction, to thereby form a scanning line; and
   a storage unit configured to store information on a scanning time of the laser light and an emitted position of the laser light in a sub-scanning direction perpendicular to the main scanning direction, the laser light measured on a plane,
   wherein the scanning time of the laser light emitted from the light source, for forming one scanning line is set based on the information on the measured scanning time and the measured emitted position, which is stored in the storage unit, and information on a shape of the scanned surface on which an electrostatic latent image is formed.

2. An optical scanning device according to claim 1, wherein the storage unit is further configured to store information on a plurality of measured emitted positions.

3. An optical scanning device according to claim 1, wherein the measured emitted position is measured by a line sensor.

4. An optical scanning device according to claim 1, wherein the storage unit is further configured to store information on the scanning time measured for each of a plurality of segments.

5. An optical scanning device according to claim 1, wherein the measured scanning time is measured by a plane sensor.

6. An optical scanning device according to claim 1, wherein the scanned surface comprises a circular arc surface; and
   the information on the shape of the scanned surface comprises a radius of the circular arc surface.

7. An optical scanning device according to claim 1, wherein the scanned surface is a photosensitive member.

8. An image forming apparatus comprising:
an optical scanning device according to claim 1;
a photosensitive member whose surface includes the scanned surface; and
a control unit configured to control the optical scanning device to form the electrostatic latent image on the scanned surface.

9. An image forming apparatus, comprising:
a photosensitive member comprising a scanned surface in a surface of the photosensitive member;
a light source configured to emit laser light;
a deflection unit configured to deflect the laser light emitted from the light source, and move a spot of the laser light emitted onto the scanned surface in a main scanning direction, to thereby form a scanning line;
a storage unit configured to store information on a scanning time of the laser light and an emitted position of the laser light in a sub-scanning direction perpendicular to the main scanning direction, the laser light measured on a plane; and
a control unit configured to cause an electrostatic latent image to be formed on the scanned surface,
the control unit being further configured to set the scanning time of the laser light emitted from the light source, for forming one scanning line to scan the scanned surface based on the information on the scanning time and the emitted position measured on the plane, which is read from the storage unit, and the information on the shape of the scanned surface on which the electrostatic latent image is formed.

10. An image forming apparatus according to claim 9, further comprising a temperature detection unit configured to detect a temperature,
wherein the control unit is further configured to correct the measured emitted position based on the information on the measured emitted position and the temperature detected by the temperature detection unit.

11. An optical scanning device, comprising:
a light source configured to emit laser light;
a deflection unit configured to deflect the laser light emitted from the light source, and move a spot of the laser light emitted onto a scanned surface in a main scanning direction, to thereby form a scanning line; and
a storage unit configured to store information on a scanning time of the laser light emitted from the light source, for forming one scanning line to scan the scanned surface in order to form one scanning line,
the scanning time stored in the storage unit being calculated based on information on the scanning time of the laser light and an emitted position of the laser light in a sub-scanning direction perpendicular to the main scanning direction, which are measured on a plane, and information on a shape of the scanned surface on which an electrostatic latent image is formed.

12. An optical scanning device according to claim 11, wherein the storage unit is further configured to store information on a plurality of emitted positions on the scanned surface.

13. An optical scanning device according to claim 11, wherein the emitted position measured on the plane is measured by a line sensor.

14. An optical scanning device according to claim 11, wherein the storage unit is further configured to store information on the scanning time on the scanned surface for each of a plurality of segments.

15. An optical scanning device according to claim 11, wherein the scanning time measured on the plane is measured by a plane sensor.

16. An optical scanning device according to claim 11,
wherein the scanned surface comprises a circular arc surface; and
the information on the shape of the scanned surface comprises a radius of the circular arc surface.

17. An image forming apparatus, comprising:
a photosensitive member comprising a scanned surface in a surface of the photosensitive member;
a light source configured to emit laser light;
a deflection unit configured to deflect the laser light emitted from the light source, and move a spot of the laser light emitted onto the scanned surface in a main scanning direction, to thereby form a scanning line;
a storage unit configured to store information on a scanning time of the laser light emitted from the light source, for forming one scanning line to scan the scanned surface in order to form one scanning line; and
a control unit configured to cause an electrostatic latent image to be formed on the scanned surface,
the control unit being further configured to calculate the scanning time stored in the storage unit based on information on a scanning time of the laser light and an emitted position of the laser light in a sub-scanning direction perpendicular to the main scanning direction, the laser light measured on a plane, and information on a shape of the scanned surface on which the electrostatic latent image is formed.

18. A correction method for correcting a scanning line of an optical scanning device,
the optical scanning device comprising:
a light source configured to emit laser light; and
a deflection unit configured to deflect the laser light emitted from the light source, and move a spot of the laser light emitted onto a scanned surface in a main scanning direction, to thereby form the scanning line,
the correction method comprising:
a first measurement process of measuring, by a first detection unit, an emitted position of the laser light emitted from the light source on a plane;
a second measurement process of measuring, by a second detection unit, a scanning time of the laser light emitted from the light source on the plane;
a calculation process of calculating an error between the measured scanning time and the scanning time on the scanned surface based on the emitted position measured in the first measurement process, the scanning time measured in the second measurement process, and information on a shape of the scanned surface on which an electrostatic latent image is formed; and
an adjustment process of adjusting a length of the scanning line based on the error calculated in the calculation process.

19. An optical scanning device, comprising:
a light source configured to emit laser light;
a deflection unit configured to deflect the laser light emitted from the light source, and move a spot of the laser light emitted onto a scanned surface in a main scanning direction, to thereby form a scanning line; and
a storage unit configured to store information on an emitted position of the laser light in a sub-scanning direction perpendicular to the main scanning direction, the laser light measured on a plane,
wherein an emitted position for forming one scanning line is set based on the information on the measured emitted position, which is stored in the storage unit, and information on a shape of the scanned surface on which an electrostatic latent image is formed;

wherein the scanned surface comprises a circular arc surface; and wherein the information on the shape of the scanned surface comprises a radius of the circular arc surface.

20. An optical scanning device according to claim 19, wherein the storage unit is further configured to store information on a plurality of measured emitted positions.

21. An optical scanning device according to claim 19, wherein the measured emitted position is measured by a line sensor.

22. An image forming apparatus, comprising:
a photosensitive member comprising a scanned surface in a surface of the photosensitive member;
a light source configured to emit laser light;
a deflection unit configured to deflect the laser light emitted from the light source, and move a spot of the laser light emitted onto the scanned surface in a main scanning direction, to thereby form a scanning line;
a storage unit configured to store information on an emitted position of the laser light in a sub-scanning direction perpendicular to the main scanning direction, the laser light measured on a plane; and
a control unit configured to cause an electrostatic latent image to be formed on the scanned surface,
the control unit being further configured to set an emitted position on the scanned surface in the sub-scanning direction, which is to be determined when the laser light is emitted onto the scanned surface, based on the information on the emitted position measured on the plane, which is read from the storage unit, and the information on the shape of the scanned surface on which the electrostatic latent image is formed.

23. An image forming apparatus according to claim 22, wherein the control unit is further configured to:
calculate a tilt amount of the scanning line of the laser light on the scanned surface based on the information on the measured emitted position and the information on the shape of the scanned surface; and
calculate the emitted position on the scanned surface based on the calculated tilt amount.

24. An image forming apparatus according to claim 22, wherein the control unit is further configured to:
calculate a bow amount of the scanning line of the laser light on the scanned surface based on the information on the measured emitted position and the information on the shape of the scanned surface; and
calculate the emitted position on the scanned surface based on the calculated bow amount.

25. An image forming apparatus according to claim 22, further comprising a temperature detection unit configured to detect a temperature,
wherein the control unit is further configured to correct the measured emitted position based on the information on the measured emitted position and the temperature detected by the temperature detection unit.

26. An optical scanning device, comprising:
a light source configured to emit laser light;
a deflection unit configured to deflect the laser light emitted from the light source, and move a spot of the laser light emitted onto a scanned surface in a main scanning direction, to thereby form a scanning line; and
a storage unit configured to store information on an emitted position on the scanned surface in a sub-scanning direction perpendicular to the main scanning direction for forming one scanning line,
the information on the emitted position stored in the storage unit being calculated based on information on an emitted position of the laser light in the sub-scanning direction, the laser light measured on a plane, and information on a shape of the scanned surface on which an electrostatic latent image is formed;

wherein the scanned surface comprises a circular arc surface; and wherein the information on the shape of the scanned surface comprises a radius of the circular arc surface.

27. An optical scanning device according to claim 26, wherein the storage unit is further configured to store information on a plurality of emitted positions on the scanned surface.

28. An optical scanning device according to claim 26, wherein the emitted position measured on the plane is measured by a line sensor.

29. An image forming apparatus, comprising:
a photosensitive member comprising a scanned surface in a surface of the photosensitive member;
a light source configured to emit laser light;
a deflection unit configured to deflect the laser light emitted from the light source, and move a spot of the laser light emitted onto the scanned surface in a main scanning direction, to thereby form a scanning line;
a storage unit configured to store information on an emitted position on the scanned surface in a sub-scanning direction perpendicular to the main scanning direction for forming one scanning line; and
a control unit configured to cause an electrostatic latent image to be formed on the scanned surface,
the control unit being further configured to calculate the information on the emitted position stored in the storage unit based on information on an emitted position of the laser light in the sub-scanning direction, the laser light measured on a plane, and information on a shape of the scanned surface on which the electrostatic latent image is formed.

30. A correction method for correcting a scanning line of an optical scanning device,
the optical scanning device comprising:
a light source configured to emit laser light; and
a deflection unit configured to deflect the laser light emitted from the light source, and move a spot of the laser light emitted onto a scanned surface in a main scanning direction, to thereby form a scanning line,
the optical scanning device being configured to form an electrostatic latent image corresponding to input image data on the scanned surface,
the correction method comprising:
a measurement process of measuring, by a detection unit, an emitted position of the laser light emitted from the light source on a plane;
a first calculation process of calculating an error between the measured emitted position and an emitted position on the scanned surface based on the emitted position measured in the measurement process and information on a shape of the scanned surface on which the electrostatic latent image is formed;
a second calculation process of calculating the emitted position on the scanned surface based on the error calculated in the first calculation process; and a correction process of correcting the input image data based on the emitted position on the scanned surface calculated in the second calculation process.

* * * * *